United States Patent
Addepalli et al.

(10) Patent No.: US 10,791,582 B2
(45) Date of Patent: *Sep. 29, 2020

(54) ATTENTION (AT) COMMANDS FOR PACKET DATA NETWORK CONNECTION OFFLOAD

(71) Applicant: Apple Inc., Cupertino, CA (US)

(72) Inventors: Kiran Kumar Addepalli, Bangalore (IN); Vivek Gupta, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/408,166

(22) Filed: May 9, 2019

(65) Prior Publication Data

US 2019/0373650 A1    Dec. 5, 2019

Related U.S. Application Data

(63) Continuation of application No. 15/567,350, filed as application No. PCT/US2015/052444 on Sep. 25, 2015, now Pat. No. 10,477,601.

(Continued)

(51) Int. Cl.
*H04W 28/08* (2009.01)
*H04W 84/12* (2009.01)
(Continued)

(52) U.S. Cl.
CPC .............. *H04W 76/12* (2018.02); *H04L 47/29* (2013.01); *H04W 28/08* (2013.01); *H04W 28/12* (2013.01);
(Continued)

(58) Field of Classification Search
CPC .............................. H04W 28/12; H04W 76/12
See application file for complete search history.

(56) References Cited

U.S. PATENT DOCUMENTS

2012/0082095 A1    4/2012   Sun
2013/0324087 A1   12/2013   Zhong
(Continued)

FOREIGN PATENT DOCUMENTS

CN    108307688    7/2018
JP    2018515967   6/2018
(Continued)

OTHER PUBLICATIONS

"International Application Serial No. PCT US2015 052444, International Search Report dated Apr. 22, 2016", 3 pgs.

(Continued)

*Primary Examiner* — Angel T Brockman
(74) *Attorney, Agent, or Firm* — Kowert, Hood, Munyon, Rankin & Goetzel, P.C.

(57) ABSTRACT

Described herein are systems, apparatuses, and processes for obtaining data for a specific PDN connection of a cellular network. A UE executes one or more applications utilizing one or more PDN connections of a cellular network. A TE generates an AT command for an MT, the AT command comprising a request for data for a specific PDN connection that can be offloaded from the cellular network to a non-cellular network, assistance data for determining offloading of traffic, and cellular signal measurements. The TE receives an AT command response, corresponding to the AT command, comprising data of whether the specific PDN connection can be offloaded, offload assistance data, and/or cellular network measurement data. The TE may receive unsolicited result codes when offloadablity of a PDN connection changes, offload assistance data changes, or when cellular signal measurements meet offload assistance criteria.

20 Claims, 12 Drawing Sheets

Related U.S. Application Data

(60) Provisional application No. 62/163,213, filed on May 18, 2015.

(51) Int. Cl.

| *H04W 88/06* | (2009.01) |
| *H04W 36/00* | (2009.01) |
| *H04W 76/12* | (2018.01) |
| *H04W 76/16* | (2018.01) |
| *H04W 28/12* | (2009.01) |
| *H04L 12/801* | (2013.01) |
| *H04W 36/36* | (2009.01) |
| *H04W 36/22* | (2009.01) |
| *H04W 36/24* | (2009.01) |

(52) U.S. Cl.
CPC ....... *H04W 36/0016* (2013.01); *H04W 36/36* (2013.01); *H04W 76/16* (2018.02); *H04W 88/06* (2013.01); *H04W 36/0033* (2013.01); *H04W 36/22* (2013.01); *H04W 36/24* (2013.01); *H04W 84/12* (2013.01)

(56) References Cited

U.S. PATENT DOCUMENTS

| 2014/0177446 | A1 | 6/2014 | Sun et al. |
| 2014/0286310 | A1 | 9/2014 | Lerzer et al. |
| 2015/0003386 | A1 | 1/2015 | Sun |
| 2015/0010045 | A1 | 1/2015 | Parron |
| 2016/0219478 | A1 | 7/2016 | Huang-fu et al. |
| 2018/0160461 | A1 | 6/2018 | Addepalli et al. |

FOREIGN PATENT DOCUMENTS

| TW | 201642696 | 12/2016 |
| WO | 2012044085 | 4/2012 |
| WO | 2013025192 | 2/2013 |
| WO | 2014008441 | 1/2014 |
| WO | 2016186685 | 11/2016 |

OTHER PUBLICATIONS

"International Application Serial No. PCT US2015 052444, Written Opinion dated Apr. 22, 2016", 4 pgs.

"3rd Generation Partnership Project; Technical Specification Group Core Network and Terminals; AT command set for User Equipment (UE) (Release 13)", 3GPP TS 27.007 V13.0.0, [Online] retrieved from the internet:http: www.3gpp.org DynaReport 27007.htm), (Mar. 20, 2015), 328 pgs.

"International Application Serial No. PCT US2015 052444, International Preliminary Report on Patentability dated Nov. 30, 2017", 6 pgs.

"Japanese Application Serial No. 2017-552151, Voluntary Amendment filed on Jan. 4, 2018", (W English Claims), 14 pgs.

"New AT command for WLAN Offload Assistance Data", 3GPP TSG-CT WG1#93, 27007 Cr0479r1 (REL-13) C1-153185 27007 Of Fload Threshold VI-Am, 3rd Generation Partnership Project (3GPP), Mobile Competence Centre ; 650, Route Des Lucioles ; F-06921 Sophia-Antipolis CE, [Online] Retrieved from the internet:URL:httpwww.3gpp.org ftp tsg_ct WG1_mm-cc-sm_ex-CN1 TSGC1_93_Vancouver docs C1-153185.zip, (2015), 12 pgs.

"European Application Serial No. 15892784.8, Extended European Search Report dated Dec. 10, 2018", 11 pgs.

"U.S. Appl. No. 15/567,350, Supplemental Preliminary Amendment filed May 13, 2019", 8 Pgs.

"Japanese Application Serial No. 2017-552151, Notification of Reasons for Rejection dated Jun. 4, 2019", w English Translation, 14 pgs.

"U.S. Appl. No. 15/567,350, Notice of Allowance dated Jun. 17, 2019", 9 pgs.

"European Application Serial No. 15892784.8, Response filed Jul. 8, 2019 to Extended European Search Report dated Dec. 10, 2018", 28 pgs.

Intel, "New At Command for WLAN Offload Based on Cell Measurements", 3GPP TSG-CT WG1#93 C1-153186,, [Online] Retrieved from the internet:URL:http: www. 3gpp.org ftp tsg_ct WG1_mm-cc-sm_ex-CN1TSGC1_93_Vancouver docs C1-153186. zip, (2015), 4 pgs.

U.S. Appl. No. 15/567,350, filed Oct. 17, 2017, Attention (AT) Commands for Packet Data Network Connection Offload.

3GPP Technical Specification, "3rd Generation Partnership Project: Technical Specification Group Core Network and Terminals; AT command set for User Equipment (UE) (Release 13)"; 3GPP TS 27.007, V13.0.0; Mar. 2015; pp. 1-326.

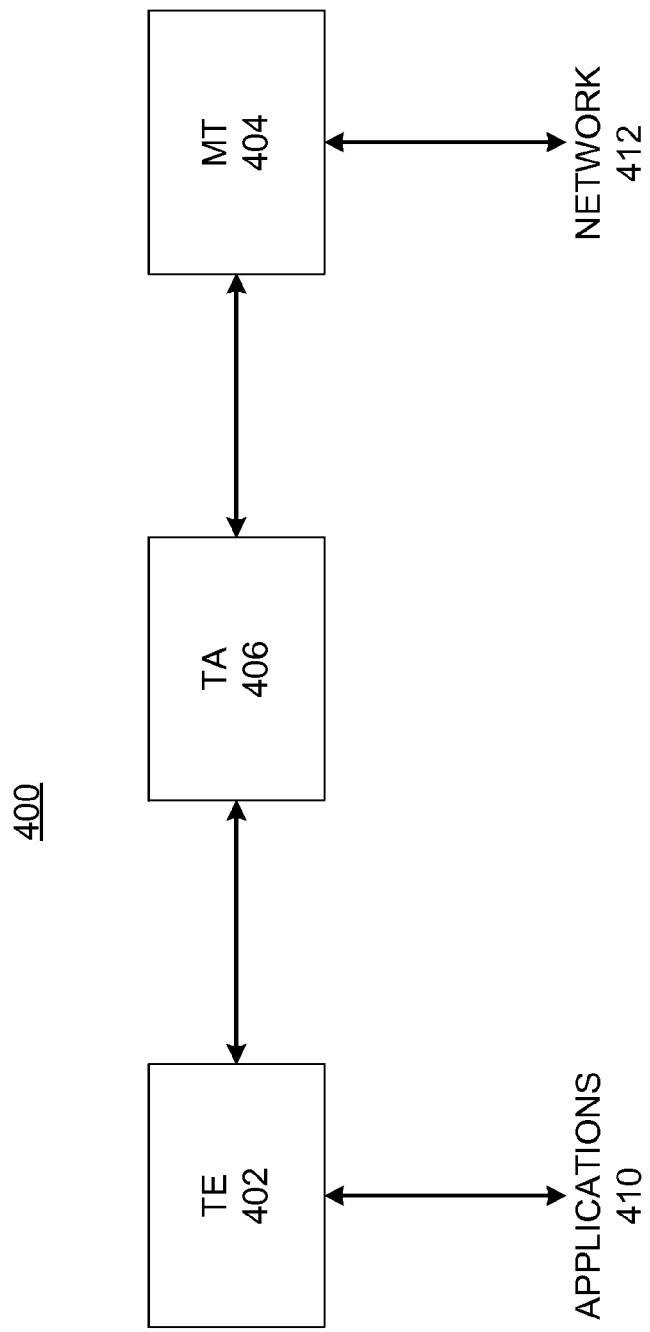

500

+CGEREP parameter command syntax

| Command | Possible response(s) |
|---|---|
| +CGEREP=[<mode>[,<bfr>]] | *+CME ERROR: <err>* |
| +CGEREP? | +CGEREP: <mode>,<bfr> |
| +CGEREP=? | +CGEREP: (list of supported <mode>s), (list of supported <bfr>s) |

+CGCONTRDP action command syntax

| Command | Possible response(s) |
|---|---|
| +CGCONTRDP[=<cid>] | [+CGCONTRDP: <cid>,<bearer_id>,<apn>[,<local_addr and subnet_mask>[,<gw_addr>[,<DNS_prim_addr>[,<DNS_sec_addr>[,<P-CSCF_prim_addr>[,<P-CSCF_sec_addr>[,<IM_CN_Signalling_Flag>[,<LIPA_indication>[,<IPv4_MTU>[,<WLAN_Offload>]]]]]]]]]]<br><br>[<CR><LF>+CGCONTRDP: <cid>,<bearer_id>,<apn>[,<local_addr and subnet_mask>[,<gw_addr>[,<DNS_prim_addr>[,<DNS_sec_addr>[,<P-CSCF_prim_addr>[,<P-CSCF_sec_addr>[,<IM_CN_Signalling_Flag>[,<LIPA_indication>[,<IPv4_MTU>[,<WLAN_Offload>]]]]]]]]]]<br><br>[...]] |
| +CGCONTRDP=? | +CGCONTRDP: (list of <cid>s associated with active contexts) |
| NOTE: The syntax of the AT Set Command is corrected to be according to ITU-T Recommendation V.250 [14]. Older versions of the specification specify incorrect syntax +CGCONTRDP=[<cid>] ||

+CGSCONTRDP action command syntax

| Command | Possible response(s) |
|---|---|
| +CGSCONTRDP[=<cid>] | [+CGSCONTRDP: <cid>,<p_cid>,<bearer_id>[,<IM_CN_Signalling_Flag>[,<WLAN_Offload>]]]<br><br>[<CR><LF>+CGSCONTRDP: <cid>,<p_cid>,<bearer_id>[,<IM_CN_Signalling_Flag>[,<WLAN_Offload>]]<br><br>[...]] |
| +CGSCONTRDP=? | +CGSCONTRDP: (list of <cid>s associated with active contexts) |
| NOTE: The syntax of the AT Set Command is corrected to be according to ITU-T Recommendation V.250 [14]. Older versions of the specification specify incorrect syntax +CGSCONTRDP=[<cid>] | |

+CWLANOLAD parameter command syntax

| Command | Possible response(s) |
|---|---|
| +CWLANOLAD=[<n>] | +CME ERROR: <err> |
| +CWLANOLAD? | +CWLANOLAD: <n>[,<threshRSCPLow>,<threshRSCPHigh>[,<threshEcnoLow>,<threshEcnoHigh>[,<threshRSRPLow>,<threshRSRPHigh>[,<threshRSRQLow>,<threshRSRQHigh>[,<threshChUtilLow>,<threshChUtilHigh>[,<threshBackhRateDLLow>,<threshBackhRateDLHigh>[,<threshBackhRateULLow>,<threshBackhRateULHigh>[,<threshBeaconRSSILow>,<threshBeaconRSSIHigh>[,<opi>[,<tSteering>[,<WLANIdentifierListLength>[,<ssid_1>,<bssid_1>,<hessid_1>][,...][,<ssid_m>,<bssid_m>,<hessid_m>]]]]]]]]]]]] |
| +CWLANOLAD=? | +CWLANOLAD: (list of supported <n>s), (list of supported <threshRSCPLow>s), (list of supported <threshRSCPHigh>s), (list of supported <threshEcnoLow>s), (list of supported <threshEcnoHigh>s), (list of supported <threshRSRPLow>s), (list of supported <threshRSRPHigh>s), (list of supported <threshRSRQLow>s), (list of supported <threshRSRQHigh>s), (list of supported <threshChUtilLow>s), (list of supported <threshChUtilHigh>s), (list of supported <threshBackhRateDLLow>s), (list of supported <threshBackhRateDLHigh>s), (list of supported <threshBackhRateULLow>s), (list of supported <threshBackhRateULHigh>s), (list of supported <threshBeaconRSSILow>s), (list of supported <threshBeaconRSSIHigh>s), (list of supported <tSteering>s), (list of supported <WLANIdentifierListLength>s) |

+CWLANOLCM parameter command syntax

| Command | Possible response(s) |
|---|---|
| +CWLANOLCM=[<n>] | +CME ERROR: <err> |
| +CWLANOLCM? | +CWLANOLCM: <n>,<rscp>,<ecno>,<rsrp>,<rsrq> |
| +CWLANOLCM=? | +CWLANOLCM: (list of supported <n>s), (list of supported <rscp>s), (list of supported <ecno>s), (list of supported <rsrp>s), (list of supported <rsrq>s) |

FIG. 5E

ATTENTION (AT) COMMANDS FOR PACKET DATA NETWORK CONNECTION OFFLOAD

PRIORITY CLAIM

This application is a continuation of U.S. patent application Ser. No. 15/567,350, filed Oct. 17, 2017, which is a U.S. National Stage Filing under 35 U.S.C. 371 from International Application No. PCT/US2015/052444, filed Sep. 25, 2015 and published in English as WO 2016/186685 on Nov. 24, 2016, which claims the benefit of U.S. Provisional Application No. 62/163,213 filed May 18, 2015, the entire contents of which are hereby incorporated by reference herein.

TECHNICAL FIELD

Embodiments pertain to wireless communications. Some embodiments relate to communication signals between user equipment (UE) components.

BACKGROUND

Wireless mobile devices or user equipments (UEs) may communicate with each other via cellular networks using radio access technologies such as the 3GPP Long-Term Evolution ("LTE") standard, 3GPP LTE Advanced Release 12 (March 2014) (the "LTE-A Standard"), the IEEE 802.16 standard, IEEE Std. 802.16-2009, published May 29, 2009 ("WiMAX"), as well as any other wireless protocols that are designated as 3G, 4G, 5G, and beyond. User equipments (UEs) can be configured to connect to one or more cellular networks and one or more non-cellular networks, such as wireless local area networks (WLANs).

BRIEF DESCRIPTION OF THE DRAWINGS

FIG. 4A is an illustration of a user equipment device as mobile termination and terminal equipment functional blocks in accordance with some embodiments.

FIG. 5A FIG. 5E illustrate command/response tables for attention commands in accordance with some embodiments.

DETAILED DESCRIPTION

The following description and the drawings sufficiently illustrate specific embodiments to enable those skilled in the art to practice them. Other embodiments can incorporate structural, logical, electrical, process, and other changes. Portions and features of some embodiments can be included in, or substituted for, those of other embodiments. Embodiments set forth in the claims encompass all available equivalents of those claims.

In some embodiments, mobile devices or other devices described herein can be part of a portable wireless communication device, such as a personal digital assistant (PDA), a laptop or portable computer with wireless communication capability, a web tablet, a wireless telephone, a smartphone, a wireless headset, a pager, a wearable mobile computing device (e.g., a mobile computing device included in a wearable housing), an instant messaging device, a digital camera, an access point, a television, a medical device (e.g., a heart rate monitor, a blood pressure monitor, etc.), or another device that can receive and/or transmit information wirelessly. In some embodiments, the mobile device or other device can be a user equipment (UE) or an evolved node-B (eNodeB) configured to operate in accordance with 3GPP standards (e.g., the 3GPP Long Term Evolution ("LTE") Advanced Release 12 (March 2014) (the "LTE-A Standard")). In some embodiments, the mobile device or other device can be configured to operate according to other protocols or standards, including IEEE 802.11 or other IEEE and 3GPP standards. In some embodiments, the mobile device or other device can include one or more of a keyboard, a display, a non-volatile memory port, multiple antennas, a graphics processor, an application processor, speakers, and other mobile device elements. The display can be a liquid crystal display (LCD) screen including a touch screen.

Figure 1:
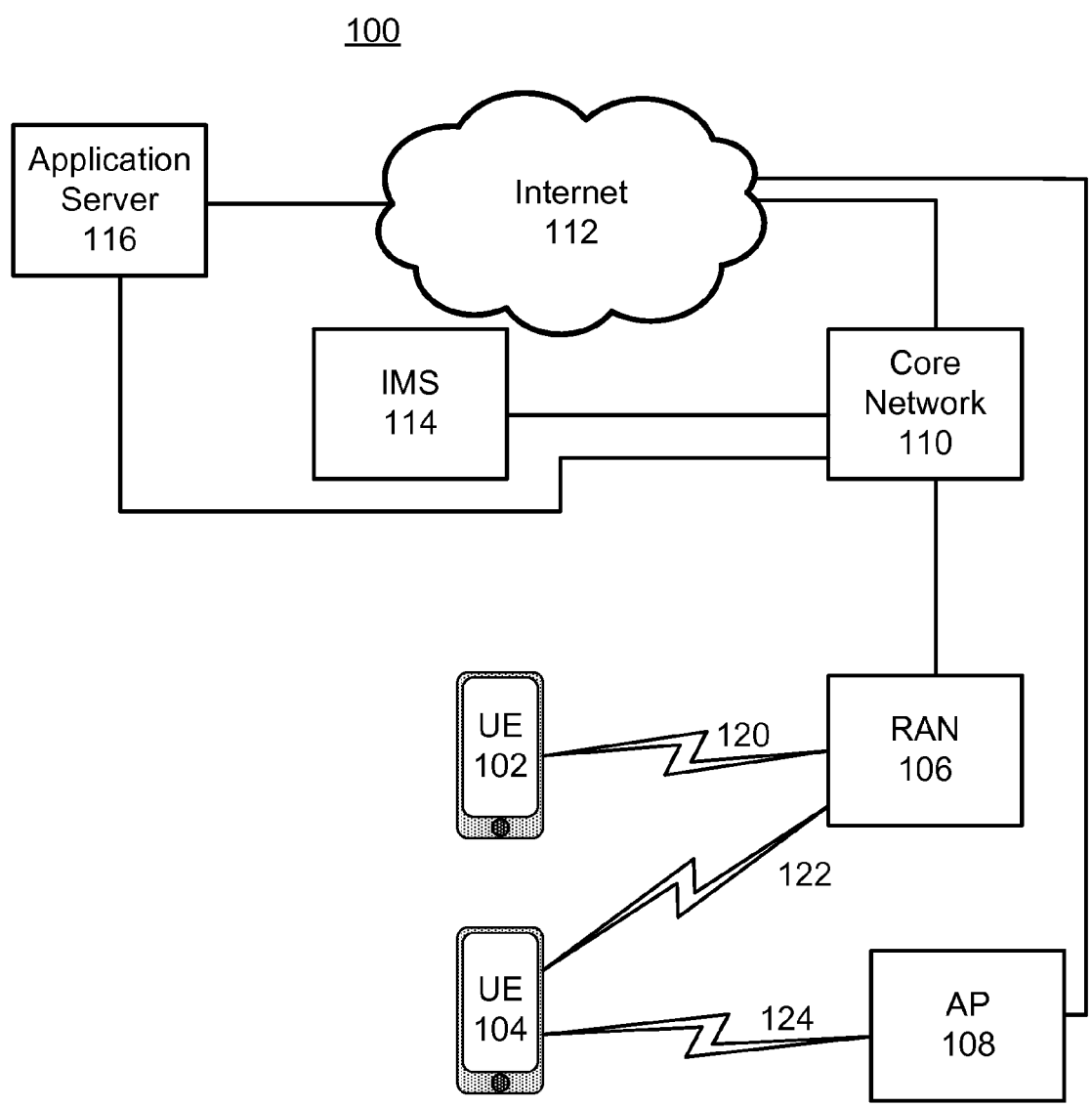
FIG. 1 illustrates an architecture of a wireless network with various components of the network in accordance with some embodiments.

FIG. 1 illustrates an architecture of a wireless network with various components of the network in accordance with some embodiments. A system 100 is shown to include a user equipment (UE) 102 and a UE 104. The UEs 102 and 104 are illustrated as smartphones (i.e., handheld touchscreen mobile computing devices connectable to one or more cellular networks), but can also include personal digital assistants (PDAs), pagers, laptop computers, desktop computers, a machine-to-machine (M2M) device, an internet of things (IoT) device, etc.

The UEs 102 and 104 are configured to access a radio access network (RAN) 106 via connections 120 and 122, respectively, each of which comprises a physical communications interface or layer; in this embodiment, the connections 120 and 122 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, etc.

The RAN 106 can include one or more access points that enable the connections 120 and 122. These access points (described in further detail below) can be referred to as access nodes, base stations (BSs), NodeBs, evolved NodeBs (eNodeBs), etc., and can comprise ground stations (i.e., terrestrial access points) or satellite access points. The RAN 106 is shown to be communicatively coupled to a core network 110. The core network 110 can be used to enable a packet-switched data exchange with the Internet 112 in addition to bridging circuit-switched calls between the UEs 102 and 104. In some embodiments, the RAN 106 can comprise an Evolved Universal Mobile Telecommunications System (UMTS) Terrestrial RAN (E-UTRAN 210), and the core network 110 can comprise an Evolved Packet Core (EPC) network.

The UE 104 is shown to be configured to access an access point (AP) 108 via a connection 124. The connection 124 can comprise a local wireless connection, such as a connection consistent with IEEE 802.11, wherein the AP 108 would comprise a wireless fidelity (WiFi) router. In this example, the AP 108 is shown to be connected to the Internet 112 without connecting to the core network 110.

The Internet 112 is shown to be communicatively coupled to an application server 116. The application server 116 can be implemented as a plurality of structurally separate servers, or can be included in a single server. The application server 116 is shown as connected to both the Internet 112 and the core network 110; in other embodiments, the core network 110 connects to the application server 116 via the Internet 112. The application server 116 can also be configured to support one or more communication services (e.g., Voice-over-Internet Protocol (VoIP) sessions, Push-to-Talk (PTT) sessions, group communication sessions, social networking services, etc.) for UEs that can connect to the application server 116 via the core network 110 and/or the Internet 112. The application server 116 can also be configured as a cloud services provider (CSP) for cellular Internet of Things (CIoT) UEs, as described in further detail below.

The core network 110 is further shown to be communicatively coupled to an Internet Protocol (IP) Multimedia Subsystem (IMS) 114. The IMS 114 comprises an integrated network of telecommunications carriers that can enable the use of IP for packet communications, such as traditional telephony, fax, e-mail, internet access, Voice over IP (VoIP), instant messaging (IM), videoconference sessions and video on demand (VoD), etc.

Figure 2:
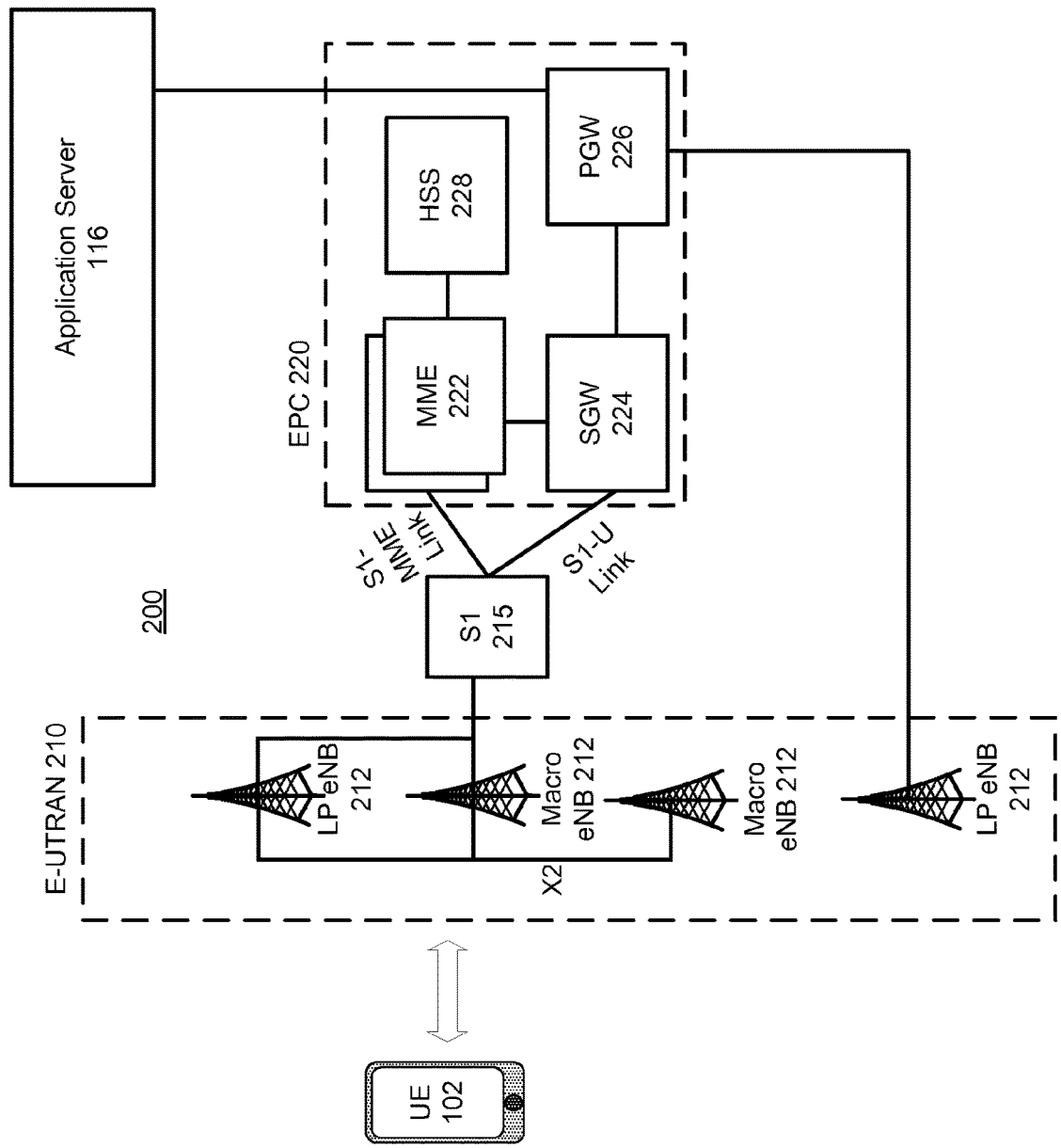
FIG. 2 illustrates an architecture of components of an LTE network in accordance with some embodiments.

FIG. 2 illustrates an architecture of components of an LTE network in accordance with some embodiments. In this example, a (sub)system 200 comprises an Evolved Packet System (EPS) on an LTE network, and thus includes an E-UTRAN 210 and an EPC network 220 communicatively coupled via an S1 interface 215. In this illustration, only a portion of the components of the E-UTRAN 210 and the EPC network 220 are shown. Some of the elements described below may be referred to as "modules" or "logic." As referred to herein, "modules" or "logic" may describe hardware (such as a circuit), software (such as a program driver), or a combination thereof (such as a programmed microprocessing unit).

The E-UTRAN 210 includes eNodeBs 212 (which can operate as base stations) for communicating with one or more UEs (e.g., the UE 102). The eNodeBs 212 are shown in this example to include macro eNodeBs and low-power (LP) eNodeBs. Any of the eNodeBs 212 can terminate the air interface protocol and can be the first point of contact for the UE 102. In some embodiments, any of the eNodeBs 212 can fulfill various logical functions for the E-UTRAN 210 including but not limited to radio network controller (RNC) functions such as radio bearer management, uplink and downlink dynamic radio resource management and data packet scheduling, and mobility management. eNodeBs in EPS/LTE networks, such as the eNodeBs 212, do not utilize a separate controller (i.e., an RNC) to communicate with the EPC network 220; in other embodiments utilizing other specification protocols, RANs can include an RNC to enable communication between BSs and core networks 110.

In accordance with some embodiments, the UE 102 can be configured to communicate using Orthogonal Frequency-Division Multiplexing (OFDM) communication signals with any of the eNodeBs 212 over a multicarrier communication channel in accordance with various communication techniques, such as an Orthogonal Frequency-Division Multiple Access (OFDMA) communication technique or a Single Carrier Frequency Division Multiple Access (SC-FDMA) communication technique, although the scope of the embodiments is not limited in this respect. The OFDM signals can comprise a plurality of orthogonal subcarriers.

In accordance with some embodiments, the UE 102 can be configured to determine a synchronization reference time based on reception of one or more signals from any of the eNodeBs 212. The UE 102 can also be configured to support device-to-device (D2D) or proximity-based services (ProSE) communication with other UEs using OFDMA, SC-FDMA, or other multiple access schemes.

The S1 interface 215 is the interface that separates the E-UTRAN 210 and the EPC network 220. It is split into two parts: the S1-U, which carries traffic data between the eNodeBs 212 and a serving gateway (S-GW) 224, and the S1-MME, which is a signaling interface between the eNodeBs 212 and one or more mobility management entities (MMES) 222. An X2 interface is the interface between the eNodeBs 212. The X2 interface can comprise two parts (not shown): the X2-C and X2-U. The X2-C is the control plane interface between the eNodeBs 212, while the X2-U is the user plane interface between the eNodeBs 212.

With cellular networks, low-power cells can be used to extend coverage to indoor areas where outdoor signals do not reach well, or to add network capacity in areas with very dense phone usage, such as train stations. As used herein, the term "LP eNodeB" refers to any suitable relatively low-power eNodeB 212 for implementing a narrower cell (i.e., narrower than a macro cell) such as a femtocell, a picocell, or a micro cell at the edge of the network. Femtocell eNodeBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, an LP eNodeB might be a femtocell eNodeB since it is coupled through a packet data network gateway (P-GW) 226. Similarly, a picocell is a wireless communication system typically covering a small area, such as in-building (offices, shopping malls, train stations, etc.) or, more recently, in-aircraft. A picocell eNodeB can generally connect through the X2 link to another eNodeB 212 such as a macro eNodeB through its base station controller (BSC) functionality. Thus, an LP eNodeB can be implemented with a picocell eNodeB since it is coupled to a macro eNodeB via an X2 interface. Picocell eNodeBs or other LP eNodeBs can incorporate some or all functionality of a macro eNodeB. In some cases, a picocell eNodeB can be referred to as an access point base station (AP BS) or enterprise femtocell.

The UE 102 performs cell selection upon power-up and cell reselections throughout its operation. The UE 102 searches for a cell provided by the E-UTRAN 210 (e.g., a macro cell or a picocell). During the cell reselection process, the UE 102 can measure reference signal strength for each neighboring cell (e.g., Reference Signal Received Power/Reference Signal Received Quality (RSRP/RSRQ)) and select a cell based on this measurement (e.g., select a cell with the highest RSRP value). After the UE 102 selects a cell, it can verify the accessibility of the cell by reading the master information block (MIB). If the UE 102 fails to read the MIB of the selected cell, it can discard the selected cell and repeat the above process until a suitable cell is discovered.

A radio resource control (RRC) state indicates whether an RRC layer of the UE 102 is logically connected to an RRC layer of the E-UTRAN 210. After the UE 102 is communicatively coupled to a cell, its RRC state is RRC_IDLE. When the UE 102 has data packets to transmit or receive, its RRC state becomes RRC_CONNECTED. The UE 102, when in an RRC_IDLE state, can associate itself to different cells.

In some embodiments, a downlink resource grid can be used for downlink transmissions from any of the eNodeBs 212 to the UE 102, while uplink transmission from the UE 102 to any of the eNodeBs 212 can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this represents the smallest quantity of resources that currently can be allocated. There are several different physical downlink channels that are conveyed using such resource blocks.

The physical downlink shared channel (PDSCH) carries user data and higher-layer signaling to the UE 102. The physical downlink control channel (PDCCH) carries information about the transport format and resource allocations related to the PDSCH channel, among other things. It also informs the UE 102 about the transport format, resource allocation, and H-ARQ (Hybrid Automatic Repeat Request) information related to the uplink shared channel. Typically, downlink scheduling (assigning control and shared channel resource blocks to the UE 102 within a cell) is performed at any of the eNodeBs 212 based on channel quality information fed back from the UE 102 to any of the eNodeBs 212, and then the downlink resource assignment information is sent to the UE 102 on the control channel (PDCCH) used for (assigned to) the UE 102.

The PDCCH uses control channel elements (CCEs) to convey the control information. Before being mapped to resource elements, the PDCCH complex-valued symbols are first organized into quadruplets, which are then permuted using a sub-block inter-leaver for rate matching. Each PDCCH is transmitted using one or more of these CCEs, where each CCE corresponds to nine sets of four physical resource elements known as resource element groups (REGs). Four quadrature phase shift keying (QPSK) symbols are mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

The EPC network 220 includes the MMEs 222, the S-GW 224, the P-GW 226, and a home subscriber server (HSS) 228. The MMEs 222 are similar in function to the control plane of legacy serving general packet radio service (GPRS) support nodes (SGSN). The MMEs 222 manage mobility aspects in access such as gateway selection and tracking area list management. The HSS 228 comprises a database for network users, including subscription-related information to support the network entities' handling of communication sessions. The EPC network 220 may comprise one or several HSSs 228, depending on the number of mobile subscribers, on the capacity of the equipment, on the organization of the network, etc. For example, the HSS 228 can provide support for routing/roaming, authentication, authorization, naming/addressing resolution, location dependencies, etc.

The S-GW 224 terminates the interface toward the E-UTRAN 210, and routes data packets between the E-UTRAN 210 and the EPC network 220. In addition, it can be a local mobility anchor point for inter-eNodeB handovers and also can provide an anchor for inter-3GPP mobility. Other responsibilities can include lawful intercept, charging, and some policy enforcement.

The S-GW 224, the MMEs 222, and the HSS 228 can be implemented in one physical node or separate physical nodes. The P-GW 226 terminates an SGi interface (not illustrated) toward the packet data network (PDN). The P-GW 226 routes data packets between the EPC network 220 and external networks (e.g., the Internet 112), and can be a key node for policy enforcement and charging data collection. The P-GW 226 and S-GW 224 can be implemented in one physical node or separated physical nodes. In this embodiment, the EPC network 220 is shown to be communicatively coupled to the application server 116, wherein packet data can be exchanged via the P-GW 226.

Figure 3:
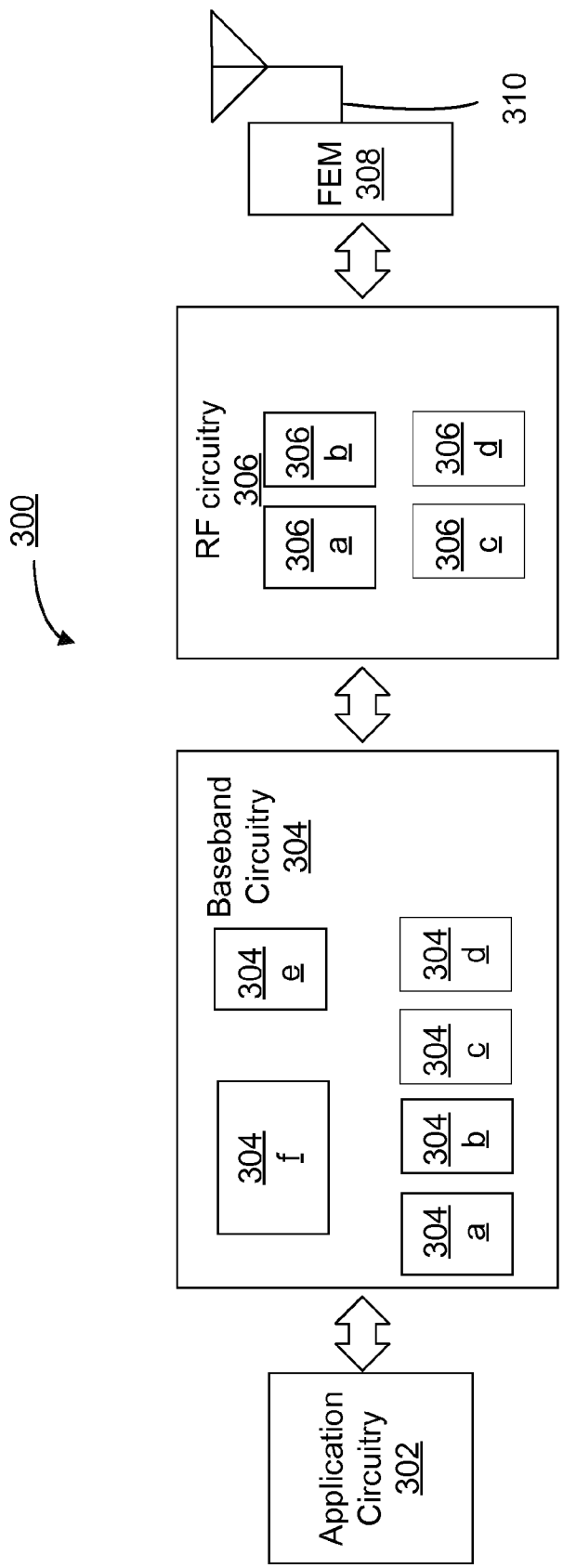
FIG. 3 illustrates example components of a user equipment device in accordance with some embodiments.

FIG. 3 illustrates example components of a UE device 300 in accordance with some embodiments. In some embodiments, the UE device 300 may include application circuitry 302, baseband circuitry 304, radio frequency (RF) circuitry 306, front-end module (FEM) circuitry 308 and one or more antennas 310, coupled together at least as shown. In some embodiments, the UE device 300 may include additional elements such as, for example, memory/storage, display, camera, sensor, and/or input/output (I/O) interface.

The application circuitry 302 may include one or more application processors. For example, the application circuitry 302 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 304 may include circuitry such as, but not limited to, one or more single-core or multi-core processors. The baseband circuitry 304 may include one or more baseband processors and/or control logic to process baseband signals received from a receive signal path of the RF circuitry 306 and to generate baseband signals for a transmit signal path of the RF circuitry 306. Baseband circuity 304 may interface with the application circuitry 302 for generation and processing of the baseband signals and for controlling operations of the RF circuitry 306. For example, in some embodiments, the baseband circuitry 304 may include a second generation (2G) baseband processor 304$a$, third generation (3G) baseband processor 304$b$, fourth generation (4G) baseband processor 304$c$, and/or other baseband processor(s) 304$d$ for other existing generations, generations in development or to be developed in the future (e.g., fifth generation (5G), 6G, etc.). The baseband circuitry 304 (e.g., one or more of baseband processors 304a-d) may handle various radio control functions that enable communication with one or more radio networks via the RF circuitry 306. The radio control functions may include, but are not limited to, signal modulation/demodulation, encoding/decoding, radio frequency shifting, etc. In some embodiments, modulation/demodulation circuitry of the baseband circuitry 304 may include fast-Fourier transform (FFT), precoding, and/or constellation mapping/demapping functionality. In some embodiments, encoding/decoding circuitry of the baseband circuitry 304 may include convolution, tail-biting convolution, turbo, Viterbi, and/or low density parity check (LDPC) encoder/decoder functionality. Embodiments of modulation/demodulation and encoder/decoder functionality are not limited to these examples and may include other suitable functionality in other embodiments.

In some embodiments, the baseband circuitry 304 may include elements of a protocol stack such as, for example, elements of an EUTRAN protocol including, for example, physical (PHY), media access control (MAC), radio link control (RLC), packet data convergence protocol (PDCP), and/or RRC elements. A central processing unit (CPU) 304e of the baseband circuitry 304 may be configured to run elements of the protocol stack for signaling of the PHY, MAC, RLC, PDCP and/or RRC layers. In some embodiments, the baseband circuitry 304 may include one or more audio digital signal processor(s) (DSP) 304f. The audio DSP(s) 304f may be or include elements for compression/decompression and echo cancellation and may include other suitable processing elements in other embodiments. Components of the baseband circuitry 304 may be suitably combined in a single chip, a single chipset, or disposed on a same circuit board, in some embodiments. In some embodiments, some or all of the constituent components of the baseband circuitry 304 and the application circuitry 302 may be implemented together, such as, for example, on a system on a chip (SOC).

In some embodiments, the baseband circuitry 304 may provide for communication compatible with one or more radio technologies. For example, in some embodiments, the baseband circuitry 304 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 304 is configured to support radio communications of more than one wireless protocol may be referred to as multi-mode baseband circuitry 304.

RF circuitry 306 may enable communication with wireless networks using modulated electromagnetic radiation through a non-solid medium. In various embodiments, the RF circuitry 306 may include switches, filters, amplifiers, etc., to facilitate the communication with the wireless network. RF circuitry 306 may include a receive signal path which may include circuitry to down-convert RF signals received from the FEM circuitry 308 and provide baseband signals to the baseband circuitry 304. RF circuitry 306 may also include a transmit signal path which may include circuitry to up-convert baseband signals provided by the baseband circuitry 304 and provide RF output signals to the FEM circuitry 308 for transmission.

In some embodiments, the RF circuitry 306 may include a receive signal path and a transmit signal path. The receive signal path of the RF circuitry 306 may include mixer circuitry 306a, amplifier circuitry 306b and filter circuitry 306c. The transmit signal path of the RF circuitry 306 may include filter circuitry 306c and mixer circuitry 306a. RF circuitry 306 may also include synthesizer circuitry 306d for synthesizing a frequency for use by the mixer circuitry 306a of the receive signal path and the transmit signal path. In some embodiments, the mixer circuitry 306a of the receive signal path may be configured to down-convert RF signals received from the FEM circuitry 308 based on the synthesized frequency provided by synthesizer circuitry 306d. The amplifier circuitry 306b may be configured to amplify the down-converted signals and the filter circuitry 306c may be a low-pass filter (LPF) or band-pass filter (BPF) configured to remove unwanted signals from the down-converted signals to generate output baseband signals. Output baseband signals may be provided to the baseband circuitry 304 for further processing. In some embodiments, the output baseband signals may be zero-frequency baseband signals. In some embodiments, mixer circuitry 306a of the receive signal path may comprise passive mixers, although the scope of the embodiments is not limited in this respect.

In some embodiments, the mixer circuitry 306a of the transmit signal path may be configured to up-convert input baseband signals based on the synthesized frequency provided by the synthesizer circuitry 306d to generate RF output signals for the FEM circuitry 308. The baseband signals may be provided by the baseband circuitry 304 and may be filtered by filter circuitry 306c. The filter circuitry 306c may include a low-pass filter (LPF), although the scope of the embodiments is not limited in this respect.

In some embodiments, the mixer circuitry 306a of the receive signal path and the mixer circuitry 306a of the transmit signal path may include two or more mixers and may be arranged for quadrature downconversion and/or upconversion respectively. In some embodiments, the mixer circuitry 306a of the receive signal path and the mixer circuitry 306a of the transmit signal path may include two or more mixers and may be arranged for image rejection (e.g., Hartley image rejection). In some embodiments, the mixer circuitry 306a of the receive signal path and the mixer circuitry 306a of the transmit signal path may be arranged for direct downconversion and/or direct upconversion, respectively. In some embodiments, the mixer circuitry 306a of the receive signal path and the mixer circuitry 306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 306 may include analog-to-digital converter (ADC) and digital-to-analog converter (DAC) circuitry and the baseband circuitry 304 may include a digital baseband interface to communicate with the RF circuitry 306.

In some dual-mode embodiments, a separate radio integrated circuit (IC) circuitry may be provided for processing signals for each spectrum, although the scope of the embodiments is not limited in this respect.

In some embodiments, the synthesizer circuitry 306d may be a fractional-N synthesizer or a fractional N/N+1 synthesizer, although the scope of the embodiments is not limited in this respect as other types of frequency synthesizers may be suitable. For example, synthesizer circuitry 306d may be a delta-sigma synthesizer, a frequency multiplier, or a synthesizer comprising a phase-locked loop with a frequency divider.

The synthesizer circuitry 306d may be configured to synthesize an output frequency for use by the mixer circuitry 306a of the RF circuitry 306 based on a frequency input and a divider control input. In some embodiments, the synthesizer circuitry 306d may be a fractional N/N+1 synthesizer.

In some embodiments, frequency input may be provided by a voltage controlled oscillator (VCO). Divider control input may be provided by either the baseband circuitry 304 or the applications processor 302, depending on the desired output frequency. In some embodiments, a divider control input (e.g., N) may be determined from a look-up table based on a channel indicated by the applications processor 302.

Synthesizer circuitry 306d of the RF circuitry 306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 306d may be configured to generate a carrier frequency as the output frequency while, in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 306 may include an IQ/polar converter.

FEM circuitry 308 may include a receive signal path which may include circuitry configured to operate on RF signals received from one or more antennas 310, amplify the received signals and provide the amplified versions of the received signals to the RF circuitry 306 for further processing. FEM circuitry 308 may also include a transmit signal path which may include circuitry configured to amplify signals for transmission provided by the RF circuitry 306 for transmission by one or more of the one or more antennas 310.

In some embodiments, the FEM circuitry 308 may include a TX/RX switch to switch between transmit mode and receive mode operation. The FEM circuitry 308 may include a receive signal path and a transmit signal path. The receive signal path of the FEM circuitry 308 may include a low-noise amplifier (LNA) to amplify received RF signals and provide the amplified received RF signals as an output (e.g., to the RF circuitry 306). The transmit signal path of the FEM circuitry 308 may include a power amplifier (PA) to amplify input RF signals (e.g., provided by RF circuitry 306), and one or more filters to generate RF signals for subsequent transmission (e.g., by one or more of the one or more antennas 310.

FIG. 4A is an illustration of a UE device as mobile termination (MT) and terminal equipment (TE) functional blocks in accordance with some embodiments. A UE 400 is illustrated as including a TE 402 and an MT 404 communicatively coupled via a terminal adaptor (TA) 406. In some embodiments, the TE 402 includes application circuitry (e.g., the application circuitry 302 of the UE 300 of FIG. 3) and the MT 404 includes baseband circuitry (e.g., the baseband circuitry 304 of the UE 300 of FIG. 3). One or more applications 410 may utilize one or more PDN connections, and can transmit data to the TE 402 indicating an application type (e.g., web browser, streaming application, etc.), quality of service (QoS) parameters of the application 410, etc. The MT 404 may interact with one or more networks 412 via any of the components illustrated in FIG. 1 and/or FIG. 2 (e.g., components of the E-UTRAN 210 and the EPC 220 of FIG. 2).

The abstract architecture of UE 400 can be physically implemented in various ways. In some embodiments, the TE 402, the MT 404, and the TA 406 are implemented as three separate entities. In some embodiments, the TA 406 is integrated under the MT 404 cover, and the TE 402 is implemented as a separate entity. In some embodiments, the TA 406 is integrated under the TE 402 cover, and the MT 404 is implemented as a separate entity. In some embodiments, the TA 406 and the MT 404 are integrated under the TE 402 cover as a single entity.

Figure 4B:
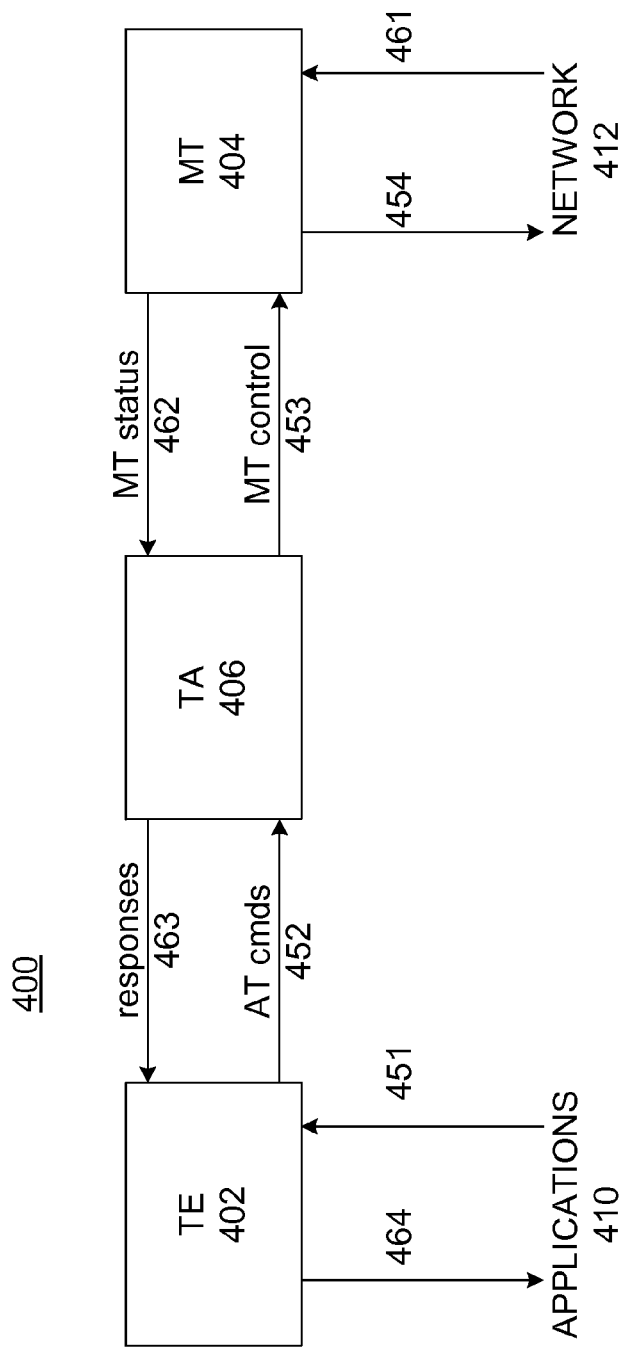
FIG. 4B illustrates a flow diagram of a process for a mobile termination and a terminal equipment of a user equipment device to exchange information in accordance with some embodiments.

FIG. 4B illustrates a flow diagram of a process for an MT 404 and a TE 402 of a UE 400 device to exchange information in accordance with some embodiments. Process and logical flow diagrams as illustrated herein provide examples of sequences of various process actions. Although the actions are shown in a particular sequence or order, unless otherwise specified, the order of the actions may be modified. Thus, the described and illustrated implementations should be understood only as examples, and the illustrated processes may be performed in a different order, and some actions may be performed in parallel. Additionally, one or more actions may be omitted in various embodiments; thus, not all actions are executed in every implementation. Other process flows are possible.

The one or more applications 410 may be executed via the UE 400 for utilizing PDNs. The one or more applications 410 may indicate a command for the TE 402 to control the MT 404 (shown as operation 451). The TE 402 may send attention (AT) commands to the TA 406 (shown as operation 452), which are then parsed as MT control commands (shown as operation 453).

The AT commands can include, for example, general commands, call control commands, network service related commands, MT control and status commands, MT errors result codes, commands for packet domain, commands for voice group call service (VGCS) and voice broadcast service (VBS), and commands for the Universal Subscriber Identity Module (USIM) Application Toolkit.

The MT 404 may transmit and receive signal data to and from the one or more networks 412 (shown as operations 454 and 461, respectively), including non-access stratum (NAS) messages for establishing PDN connections and maintaining PDN connections as the UE 400 moves. The MT 404 can send MT status messages to the TA 406 (shown as operation 462), which the TA 406 sends to the TE 402 as responses to the AT commands (shown as operation 463). Data from these responses may then be transmitted to the one or more applications 410 (shown as operation 464).

Thus, AT commands provide a way for the TE 402 to control the MT 404. The UE 400 may be coupled to a cellular network and/or a non-cellular network (e.g., a WLAN). When the UE 400 is initially coupled to a cellular network and then subsequently also connects to a non-cellular network, the UE 400 may perform traffic offloading—i.e., offloading a PDN connection to the non-cellular network. Cellular network components (e.g., the PGW 226 of FIG. 2) may decide which PDN connection is to be offloaded to the non-cellular network, and provide this information to the MT 404 via one or more NAS messages.

In some embodiments, existing AT commands sent by the TE 402 and their associated responses sent by the MT 404 are modified so that they may indicate to the TE 402 which PDN connections can be offloaded to the non-cellular network.

FIG. 5A-FIG. 5C illustrate command/response tables for modified AT commands in accordance with some embodiments. As described below, these modified AT commands allow for a TE 402 to receive data indicating offload-ability characteristics for specific PDN connections, and also allow for a TE to independently query and determine WLAN offload characteristics of individual primary and secondary packet data protocol (PDP) contexts of a PDN connection. The command/response tables described below may be used in a variety of cellular communications protocols, such as 3GPP (LTE) protocols, legacy 3GPP UMTS Terrestrial Radio Access Network (UTRAN) network protocols, and so forth.

For the purposes of the illustrated command/response tables, the following syntactical definitions apply:

<CR> Carriage return character, which value is specified with command S3.

<LF> Linefeed character, which value is specified with command S4.

< . . . > Name enclosed in angle brackets is a syntactical element. Brackets themselves do not appear in the command line.

[ . . . ] Optional subparameter of a command or an optional part of TA information response is enclosed in square brackets. Brackets themselves do not appear in the command line. When subparameter is not given in parameter type commands, new value equals to its previous value. In action type commands, action should be done on the basis of the recommended default setting of the subparameter.

<u>underline</u> Underlined defined subparameter value is the recommended default setting of this subparameter. In parameter type commands, this value should be used in factory settings which may be configured, for example, by ITU-T Recommendation V.250: "Serial asynchronous automatic dialing and control." In action type commands, this value should be used when subparameter is not given.

FIG. 5A illustrates a command/response table 500 for the packet domain event reporting (+CGEREP) AT command. In this embodiment, the +CGREP command is updated to provide WLAN offload characteristics of a PDN connection, when the PDN connection is activated, deactivated or modified.

More specifically, with regard to the +CGREP command, set command enables or disables sending of unsolicited result codes, +CGEV: XXX from MT to TE in the case of certain events occurring in the Packet Domain MT or the network. <mode> controls the processing of unsolicited result codes specified within this command. <bfr> controls the effect on buffered codes when <mode>1 or 2 is entered. If a setting is not supported by the MT, ERROR or +CME ERROR: is returned. Refer subclause 9.2 for possible <err> values may comprise, for example, values defined in subclause 9.2 of 3GPP TS 27.007 "AT Command set for User Equipment (UE)."

Read command returns the current mode and buffer settings

Test command returns the modes and buffer settings supported by the MT as compound values.

Defined values are as follows:

<mode>: integer type

| | |
|---|---|
| 0 | buffer unsolicited result codes in the MT; if MT result code buffer is full, the oldest ones can be discarded. No codes are forwarded to the TE. |
| 1 | discard unsolicited result codes when MT-TE link is reserved (e.g. in on-line data mode); otherwise forward them directly to the TE |
| 2 | buffer unsolicited result codes in the MT when MT-TE link is reserved (e.g. in on-line data mode) and flush them to the TE when MT-TE link becomes available; otherwise forward them directly to the TE |

<bfr>: integer type

| | |
|---|---|
| 0 | MT buffer of unsolicited result codes defined within this command is cleared when <mode> 1 or 2 is entered |
| 1 | MT buffer of unsolicited result codes defined within this command is flushed to the TE when <mode> 1 or 2 is entered (OK response shall be given before flushing the codes) |

Defined events are valid for GPRS/UMTS and LTE.

For network attachment, the following unsolicited result codes and the corresponding events are defined:

+CGEV: NW DETACH

The network has forced a PS detach. This implies that all active contexts have been deactivated. These are not reported separately.

+CGEV: ME DETACH

The mobile termination has forced a PS detach. This implies that all active contexts have been deactivated. These are not reported separately.

For MT class, the following unsolicited result codes and the corresponding events are defined:

+CGEV: NW CLASS <class>

The network has forced a change of MT class. The highest available class is reported (see+CGCLASS). The format of the parameter <class> is found in command+CGCLASS.

+CGEV: ME CLASS <class>

The mobile termination has forced a change of MT class. The highest available class is reported (see+CGCLASS). The format of the parameter <class> is found in command+CGCLASS.

For PDP context activation, the following unsolicited result codes and the corresponding events are defined:

+CGEV: NW PDN ACT <cid>[,<WLAN_Offload>]

The network has activated a context. The context represents a Primary PDP context in GSM/UMTS. The <cid> for this context is provided to the TE. The format of the parameter <cid> is found in command+CGDCONT.

<WLAN_Offload>: integer type. An integer that indicates whether traffic can be offloaded using the specified PDN connection via a WLAN or not. This refers to bit 1 (E-UTRAN offload acceptability value) and bit 2 (UTRAN offload acceptability value) in the WLAN offload acceptability IE as specified in, for example, 3GPP TS 24.008: "Mobile Radio Interface Layer 3 specification; Core Network Protocols-Stage 3."

| | |
|---|---|
| 0 | offloading the traffic of the PDN connection via a WLAN when in S1 mode or when in Iu mode is not acceptable. |
| 1 | offloading the traffic of the PDN connection via a WLAN when in S1 mode is acceptable, but not acceptable in Iu mode. |
| 2 | offloading the traffic of the PDN connection via a WLAN when in Iu mode is acceptable, but not acceptable in S1 mode. |
| 3 | offloading the traffic of the PDN connection via a WLAN when in S1 mode or when in Iu mode is acceptable. |

NOTE: This event is not applicable for EPS. S1 mode refers to a user equipment initiating signaling in E-UTRAN, Iu mode refers to a user equipment initiating signaling in UTRAN.

+CGEV: ME PDN ACT <cid>[,<reason>[,<cid_other>]][, <WLA N_Offload>]

The mobile termination has activated a context. The context represents a PDN connection in LTE or a Primary PDP context in GSM/UMTS. The <cid> for this context is provided to the TE. This event is sent either in result of explicit context activation request (+c GACT), or in result of implicit context activation request associated to attach request (+CGATT=1). The format of the parameters <cid> and <cid_other> are found in command+CGDCONT. The format of the parameter <WLAN_Offload> is defined above.<reason>: integer type; indicates the reason why the context activation request for PDP type IPv4v6 was not granted. This parameter is only included if the requested PDP type associated with <cid> is IPv4v6, and the PDP type assigned by the network for <cid> is either IPv4 or IPv6.

| | |
|---|---|
| 0 | IPv4 only allowed |
| 1 | IPv6 only allowed |
| 2 | single address bearers only allowed. |
| 3 | single address bearers only allowed and MT initiated context activation for a second address type bearer was not successful. |

<cid_other>: integer type; indicates the context identifier allocated by MT for an MT initiated context of a second address type. MT shall only include this parameter if <reason> parameter indicates single address bearers only allowed, and MT supports MT initiated context activation of a second address type without additional commands from TE, and MT has activated the PDN connection or PDP context associated with <cid_other>.

NOTE: For legacy TEs supporting MT initiated context activation without TE requests, there is also a subsequent event+CGEV: ME PDN ACT <cid_other> returned to TE.

+CGEV: NW ACT <p_cid>, <cid>, <event_type>[, <WLAN_Offload>]

The network has activated a context. The <cid> for this context is provided to the TE in addition to the associated primary <p_cid>. The format of the parameters <p_cid> and <cid> are found in command +CGDSCONT. The format of the parameter <WLAN_Offload> is defined above.

<event_type>: integer type; indicates whether this is an informational event or whether the TE has to acknowledge it.

| | |
|---|---|
| 0 | Informational event |
| 1 | Information request: Acknowledgement required. The acknowledgement can be accept or reject, see +CGANS. |

+CGEV: ME ACT <p_cid>, <cid>, <event_type>[, <WLAN_Offload>]

The network has responded to an ME initiated context activation. The <cid> for this context is provided to the TE in addition to the associated primary <p_cid>. The format of the parameters <p_cid> and <cid> are found in command+CGDSCONT. The format of the parameters <event_type> and <WLAN_Offload> is defined above.

For PDP context deactivation, the following unsolicited result codes and the corresponding events are defined:

+CGEV: NW DEACT <PDP_type>, <PDP_addr>, [<cid>]

The network has forced a context deactivation. The <cid> that was used to activate the context is provided if known to the MT. The format of the parameters <PDP_type>, <PDP_addr> and <cid> are found in command+CGDCONT.

+CGEV: ME DEACT <PDP_type>, <PDP_addr>, [<cid>]

The mobile termination has forced a context deactivation. The <cid> that was used to activate the context is provided if known to the MT. The format of the parameters <PDP_type>, <PDP_addr> and <cid> are found in command+CGDCONT.

+CGEV: NW PDN DEACT <cid>[,<WLAN_Offload>]

The network has deactivated a context. The context represents a PDN connection in LTE or a Primary PDP context in GSM/UMTS. The associated <cid> for this context is provided to the TE. The format of the parameter <cid> is found in command+CGDCONT. The format of the parameter <WLAN_Offload> is defined above.

NOTE: Occurrence of this event replaces usage of the event +CGEV: NW DEACT <PDP_type>, <PDP_addr>, [<cid>].

+CGEV: ME PDN DEACT <cid>

The mobile termination has deactivated a context. The context represents a PDN connection in LTE or a Primary PDP context in GSM/UMTS. The <cid> for this context is provided to the TE. The format of the parameter <cid> is found in command+CGDCONT.

NOTE: Occurrence of this event replaces usage of the event +CGEV: ME DEACT <PDP_type>, <PDP_addr>, [<cid>].

+CGEV: NW DEACT <p_cid>, <cid>, <event_type>[, <WLAN_Offload>]

The network has deactivated a context. The <cid> for this context is provided to the TE in addition to the associated primary <p_cid>. The format of the parameters <p_cid> and <cid> are found in command +CGDSCONT. The format of the parameters <event_type> <WLAN_Offload> is defined above.

NOTE: Occurrence of this event replaces usage of the event +CGEV: NW DEACT <PDP_type>, <PDP_addr>, [<cid>].

+CGEV: ME DEACT <p_cid>, <cid>, <event_type>

The network has responded to an ME initiated context deactivation request. The associated <cid> is provided to the TE in addition to the associated primary <p_cid>. The format of the parameters <p_cid> and <cid> are found in command+CGDSCONT. The format of the parameter <event_type> is defined above.

NOTE: Occurrence of this event replaces usage of the event +CGEV: ME DEACT <PDP_type>, <PDP_addr>, [<cid>].

For PDP context modification, the following unsolicited result codes and the corresponding events are defined:

+CGEV: NW MODIFY <cid>, <change_reason>, <event_type>[, <WLAN_Offload>]

The network has modified a context. The associated <cid> is provided to the TE in addition to the <change_reason> and <event_type>. The format of the parameter <cid> is found in command+CGDCONT or +CGDSCONT. The format of the parameters <change_reason>, <event_type>, and <WLAN_Offload> are defined above.

<change_reason>: integer type; a bitmap that indicates what kind of change occurred.

The <change_reason> value is determined by summing all the applicablebits. For example if both the values of the QoS changed (Bit 2) and WLAN_Offload changed (Bit 3) havechanged, then <change_reason> value is 6.

NOTE: The WLAN offload value will change when bit 1 or bit 2 or both of the indicators in the WLAN offload acceptability IE change, see the parameter <WLAN_Offload> defined above.

| | |
|---|---|
| Bit 1 | TFT changed |
| Bit 2 | Qos changed |
| Bit 3 | WLAN Offload changed |

+CGEV: ME MODIFY <cid>, <change_reason>, <event_type>[,<WLAN_Offload>]

The mobile termination has modified a context. The associated <cid> is provided to the TE in addition to the <change_reason> and <event_type>. The format of the parameter <cid> is found in command+CGDCONT or +CGDSCONT. The format of the parameters <change_reason>, <event_type> and <WLAN_Offload> are defined above.

For other PDP context handling, the following unsolicited result codes and the corresponding events are defined:

+CGEV: REJECT <PDP_type>, <PDP_addr>

A network request for context activation occurred when the MT was unable to report it to the TE with a +CRING unsolicited result code and was automatically rejected. The format of the parameters <PDP_type> and <PDP_addr> are found in command+CGDCONT.

NOTE: This event is not applicable for EPS.

+CGEV: NW REACT <PDP_type>, <PDP_addr>, [<cid>]

The network has requested a context reactivation. The <cid> that was used to reactivate the context is provided if known to the MT. The format of the parameters <PDP_type>, <PDP_addr> and <cid> are found in command+CGDCONT.

NOTE: This event is not applicable for EPS

FIG. 5B illustrates a command/response table 510 for the PDP context read dynamic parameters (+CGCONTRDP) command. In this embodiment, the +CGCONTRDP command can be used to query WLAN offload characteristics of any active PDN connection associated with a primary PDP context. As discussed herein a PDP Context comprises a record of parameters, including information for establishing an end-to-end connection, such as PDP Type, PDP address type, QoS profile request (e.g., QoS parameters requested by user), QoS profile negotiated (e.g., QoS parameters negotiated by network), Authentication type (e.g., PAP or CHAP), and DNS type (e.g., Dynamic DNS or Static DNS).

More specifically, with regard to the +CGCONTRDP command, the execution command returns the relevant information <bearer_id>, <apn>, <local_addr and subnet_mask>, <gw_addr>, <DNS_prim_addr>, <DNS_sec_addr>, <P-CSCF_prim_addr>, <P-CSCF_sec_addr>, <IM_CN_Signalling_Flag>, <LIPA_indication>, <IPv4_MTU> and <WLAN_Offload> for an active non secondary PDP context with the context identifier <cid>.

The above fields may describe, for example, a bearer identification associated with the Primary PDP context, an access point name associated with the Primary PDP context, a local address and subnet mask associated with the Primary PDP context, a gateway address associated with the Primary PDP Context, primary or secondary domain name system (DNS) Server address associated with the primary context, primary or secondary proxy-call session control function (P-CSCF) Server address associated with the Primary PDP context, an IP Multimedia Core Network (IM_CN) flag associated with the Primary PDP context identifying the PDN connection as a multimedia PDN Connection, a local IP access (LIPA) indicator associated with the Primary PDP context, an IP maximum transmission unit (MTU) defining a maximum packet size for the primary PDP Context, or data indicating whether the PDN connection associated with a Primary PDP context can be offloaded from the cellular network to the non-cellular network.

If the MT indicates more than two IP addresses of P-CSCF servers or more than two IP addresses of DNS servers, multiple lines of information per <cid> will be returned.

If the MT has dual stack capabilities, at least one pair of lines with information is returned per <cid>. First one line with the IPv4 parameters followed by one line with the IPv6 parameters. If this MT with dual stack capabilities indicates more than two IP addresses of P-CSCF servers or more than two IP addresses of DNS servers, multiple of such pairs of lines are returned.

NOTE: If the MT doesn't have all the IP addresses to be included in a line, e.g. in case the UE received four IP addresses of DNS servers and two IP addresses of P-CSCF servers, the parameter value representing an IP address that cannot be populated is set to an empty string or an absent string.

If the parameter <cid> is omitted, the relevant information for all active non secondary PDP contexts is returned.

The test command returns a list of <cid> s associated with active non secondary contexts.

Defined values:

<cid>: integer type; specifies a particular non secondary PDP context definition. The parameter is local to the TE-MT interface and is used in other PDP context-related commands (see the +CGDCONT and +CGDSCONT commands).

<bearer_id>: integer type; identifies the bearer, i.e. the EPS bearer in EPS and the NSAPI in UMTS/GPRS.

<apn>: string type; a logical name that was used to select the GGSN or the external packet data network.

<local_addr and subnet_mask>: string type; shows the IP address and subnet mask of the MT. The string is given as dot-separated numeric (0-255) parameters on the form:

"a1.a2.a3.a4.m1.m2.m3.m4" for IPv4 or "a1.a2.a3.a4.a5.a6.a7.a8.a9.a10.a11.a12.a13.a14.a15.a16.m1.m2.m3.m4.m5.m6.m7.m8.m9.m10.m11.m12.m13.m14.m15.m16" for IPv6.

When +CGPIAF is supported, its settings can influence the format of this parameter returned with the execute form of +CGCONTRDP.

<gw_addr>: string type; shows the Gateway Address of the MT. The string is given as dot-separated numeric (0-255) parameters.

When +CGPIAF is supported, its settings can influence the format of this parameter returned with the execute form of +CGCONTRDP.

<DNS_prim_addr>: string type; shows the IP address of the primary DNS server.

When +CGPIAF is supported, its settings can influence the format of this parameter returned with the execute form of +CGCONTRDP.

<DNS_sec_addr>: string type; shows the IP address of the secondary DNS server.

When +CGPIAF is supported, its settings can influence the format of this parameter returned with the execute form of +CGCONTRDP.

<P_CSCF_prim_addr>: string type; shows the IP address of the primary P-CSCF server.

When +CGPIAF is supported, its settings can influence the format of this parameter returned with the execute form of +CGCONTRDP.

<P_CSCF_sec_addr>: string type; shows the IP address of the secondary P-CSCF server.

When +CGPIAF is supported, its settings can influence the format of this parameter returned with the execute form of +CGCONTRDP.

<IM_CN_Signalling_Flag>: integer type; shows whether the PDP context is for IM CN subsystem-related signalling only or not.

| | |
|---|---|
| 0 | PDP context is not for IM CN subsystem-related signalling only |
| 1 | PDP context is for IM CN subsystem-related signalling only |

<LIPA_indication>: integer type; indicates that the PDP context provides connectivity using a LIPA PDN connection. This parameter cannot be set by the TE.

| | |
|---|---|
| 0 | indication not received that the PDP context provides connectivity using a LIPA PDN connection |
| 1 | indication received that the PDP context provides connectivity using a LIPA PDN connection |

<IPv4_MTU>: integer type; shows the IPv4 MTU size in octets.

<WLAN_Offload>: integer type. An integer that indicates whether traffic can be offloaded using the specified PDN connection via a WLAN or not. This refers to bits 1 and 2 of the WLAN offload acceptability IE as specified in, for example, 3GPP TS 24.008 subclause 10.5.6.20.

| | |
|---|---|
| 0 | offloading the traffic of the PDN connection via a WLAN when in S1 mode or when in Iu mode is not acceptable. |
| 1 | offloading the traffic of the PDN connection via a WLAN when in S1 mode is acceptable, but not acceptable in Iu mode. |
| 2 | offloading the traffic of the PDN connection via a WLAN when in Iu mode is acceptable, but not acceptable in S1 mode. |
| 3 | offloading the traffic of the PDN connection via a WLAN when in S1 mode or when in Iu mode is acceptable. |

FIG. 5C illustrates a command/response table 520 for the secondary PDP context read dynamic parameters (+CGSCONTRDP) command. In this embodiment, the +CGSCONTRDP command can be used to query WLAN offload characteristics of an active PDN connection associated with any active secondary PDP context.

More specifically, with regard to the +CGSCONTRDP command, the execution command returns <p_cid>, <bearer_id>, <IM_CN_Signalling_Flag> and <WLAN_Offload> for an active secondary PDP context with the context identifier <cid>.

If the parameter <cid> is omitted, the <cid>, <p_cid>, <bearer_id>, <IM_CN_Signalling_Flag> and <WLAN_Offload> are returned for all active secondary PDP contexts.

In EPS, the Traffic Flow parameters are returned.

NOTE: Parameters for UE initiated and network initiated PDP contexts are returned.

The test command returns a list of <c d>s associated with active secondary PDP contexts.

Defined values:

<cid>: integer type; specifies a particular active secondary PDP context or Traffic Flows definition. The parameter is local to the TE-MT interface and is used in other PDP context-related commands (see the +CGDCONT and +CGDSCONT commands).

<p_cid>: integer type; specifies a particular PDP context definition or default EPS context Identifier which has been specified by use of the +CGDCONT command. The parameter is local to the TE-MT interface (see the +CGDSCONT command).

<bearer_id>: integer type; identifies the bearer, EPS Bearer in EPS and NSAPI in UMTS/GPRS.

<IM_CN_Signalling_Flag>: integer type; shows whether the PDP context is for IM CN subsystem-related signalling only or not.

0 PDP context is not for IM CN subsystem-related signalling only

1 PDP context is for IM CN subsystem-related signalling only

<WLAN_Offload>: integer type. An integer that indicates whether traffic can be offloaded using the specified PDN connection via a WLAN or not. This refers to bits 1 and 2 of the WLAN offload acceptability IE as specified in, for example, 3GPP TS 24.008, subclause 10.5.6.20.

0 offloading the traffic of the PDN connection via a WLAN when in S1 mode or when in Iu mode is not acceptable.

1 offloading the traffic of the PDN connection via a WLAN when in S1 mode is acceptable, but not acceptable in Iu mode.

2 offloading the traffic of the PDN connection via a WLAN when in Iu mode is acceptable, but not acceptable in S1 mode.

3 offloading the traffic of the PDN connection via a WLAN when in S1 mode or when in Iu mode is acceptable.

Thus, in the embodiments discussed above, pre-existing AT Commands +CGEREP, +CGCONTRDP and +CGSCONTRDP are extended to provide WLAN offloading indications on a per PDN connection basis to a TE. Furthermore, the WLAN_Offload setting could be considered as being specific for each individual PDN connection. Adding WLAN_Offload setting as a new parameter allows having this setting apply to offloading of every single PDN connection. Furthermore this parameter allows to determine WLAN offload characteristics to specific Radio Access Technologies (RATs) such as UTRAN or EUTRAN.

FIG. 5D illustrates a command/response table 530 for providing WLAN offload assistance information in accordance with some embodiments. The table 540 illustrates a WLAN Offload Assistance Data (+CWLANOLAD) AT command; set command enables or disables the sending of the following unsolicited result code from MT to TE whenever the WLAN offload assistance data changes at the MT.

+CWLANOLADI:[,<threshRSCPLow>,<threshRSCPHigh>[,<thresh EcnoLow>,<threshEcnoHigh>[,<threshRSRPLow>,<threshRSR PHigh>[,<threshRSRQLow>,<threshRSRQHigh>[,<threshChUtil Low>,<threshChUtilHigh>[,<threshBackhRateDLLow>,<thresh BackhRateDLHigh>[,<threshBackhRateULLow>,<threshBack hRateULHigh>[,<threshBeaconRSSILow>,<threshBeaconRSSIHigh >[,<opi>[,<tSteering>[,<WLANIdentifierListLength>[, <ssid_1>,<bssid_1>,<hessid_1>][,...][,<ssid_m>,<bssid_m>, <hessid_m>]]]]]]]]]]]

If a setting is not supported by the MT, ERROR or +CME ERROR: is returned.

Read command returns the current status of result code and the WLAN offload assistance data currently available at the MT.

Test command returns the values supported by MT as compound values.

Defined values:

<n>: integer type

| 0 | disable WLAN Offload Assistance Data unsolicited result code |
| 1 | enable WLAN Offload Assistance Data unsolicited result code +CWLANOLADI |

<threshRSCPLow>: integer type; indicates the threshold for received signal code power for offloading traffic from UTRAN to WLAN.

<threshRSCPHigh>: integer type; indicates the threshold for received signal code power for offloading traffic from WLAN to UTRAN.

<threshEcnoLow>: integer type; indicates the threshold for ratio of the received energy per pseudorandom noise (PN) chip to the total received power spectral density for offloading traffic from UTRAN to WLAN.

<threshEcnoHigh>: integer type; indicates the threshold for ratio of the received energy per PN chip to the total received power spectral density for offloading traffic from WLAN to UTRAN.

<threshRSRPLow>: integer type; indicates the threshold for reference signal received power for offloading traffic from E-UTRAN to WLAN.

<threshRSRPHigh>: integer type; indicates the threshold for reference signal received power for offloading traffic from WLAN to E-UTRAN.

<threshRSRQLow>: integer type; indicates the threshold for reference signal received quality for offloading traffic from E-UTRAN to WLAN.

<threshRSRQHigh>: integer type; indicates the threshold for reference signal received quality for offloading traffic from WLAN to E-UTRAN.

(the above values may be consistent with, for example, subclause 8.69 of 3GPP TS 27.007 "AT Command set for User Equipment (UE)."

<threshChUtilLow>: integer type; indicates the low threshold value of WLAN channel utilization (BSS load).obtained from 802.11 (Beacon or Probe Response) signalling for traffic offloading to WLAN.

<threshChUtilHigh>: integer type; indicates the high threshold value of WLAN channel utilization (BSS load) obtained from 802.11 (Beacon or Probe Response) signalling for traffic offloading to UTRAN or E-UTRAN. Refer to IEEE 802.11 [152].

(the above values may be consistent with an IEEE 802.11 (for example IEEE 802.11n) radio communication standard.

<threshBackhRateDLLow>: integer type; indicates the low threshold value of backhaul available downlink bandwidth for traffic offloading to UTRAN or E-UTRAN.

<threshBackhRateDLHigh>: integer type; indicates the high threshold value of backhaul available downlink bandwidth for traffic offloading to WLAN.

<threshBackhRateULLow>: integer type; indicates the low threshold value of backhaul available uplink bandwidth for traffic offloading to UTRAN or E-UTRAN.

<threshBackhRateDLHigh>: integer type; indicates the high threshold value of backhaul available uplink bandwidth for traffic offloading to WLAN.

(the above values may be consistent with a Wi-Fi Certified passpoint (e.g., Hot Spot 2.0) specification.

<threshBeaconRSSILow>: integer type; indicates the low threshold value of beacon RSSI used for traffic offloading to UTRAN or E-UTRAN.

<threshBeaconRSSIHigh>: integer type; indicates the high threshold value of beacon RSSI used for traffic offloading to WLAN.

(the above values may be consistent with an IEEE 802.11 (for example IEEE 802.11n) radio communication standard.

<opi>: integer type; A 16-bit integer formatted as a bitmap that specifies the Offload Preference Indicator.

(the above values may be consistent with, for example, 3GPP TS 24.312 "Access Network Discovery and Selection Function (ANDSF) Management Object (MO)."

<tSteering>: integer type; indicates the timer value in seconds during which the rules should be fulfilled before starting traffic offloading between E-UTRAN and WLAN.

<ssid>: octet string type; indicates the 802.11 Service Set Identifier (SSID).

<bssid>: octet string type; indicates the 802.11 Basic Service Set Identifier (BSSID).

<hessid>: octet string type; indicates the 802.11 Homogenous Extended Service Set Identifier (HESSID).

(the above values may be consistent with an IEEE 802.11 (for example IEEE 802.11n) radio communication standard.

<WLANIdentifierListLength>: integer type; indicates the number of entries in WLAN identifier list which is a tuple consisting of <ssid>, <bssid>, <hessid> identifiers. If any of the identifier is not present it will be indicated as an empty string.

FIG. 5E illustrates a command/response table 540 for providing WLAN Offload Cell Measurement information in accordance with some embodiments. The table 550 illustrates a WLAN Offload Cell Measurement (+CWLANOLCM) AT command; set command enables or disables the sending of the following unsolicited result code from MT to TE whenever the cell measurement parameters meet the criteria for WLAN offloading based on configured thresholds.

+CWLANOLCMI: <rscp>,<ecno>,<rsrp>,<rsrq>

If a setting is not supported by the MT, ERROR or +CME ERROR: is returned.

Read command returns the current status of result code presentation and the measurements from the current primary serving cell at the MT.

Test command returns the values supported by MT as compound values.

Defined values:

<n>: integer type

| | |
|---|---|
| 0 | disable WLAN Offload Cell Measurement unsolicited result code |
| 1 | enable WLAN Offload Cell Measurement unsolicited result code +CWLANOLCMI |

<rscp>: integer type; indicates the received signal code power.

<ecno>: integer type; indicates the ratio of the received energy per PN chip to the total received power spectral density.

<rsrp>: integer type; indicates the reference signal received power.

<rsrq>: integer type; indicates the reference signal received quality.

(the above values may be consistent with, for example, the +CESQ command as described in subclause 8.69 of 3GPP TS 27.007 "AT Command set for User Equipment (UE)."

Figure 6:
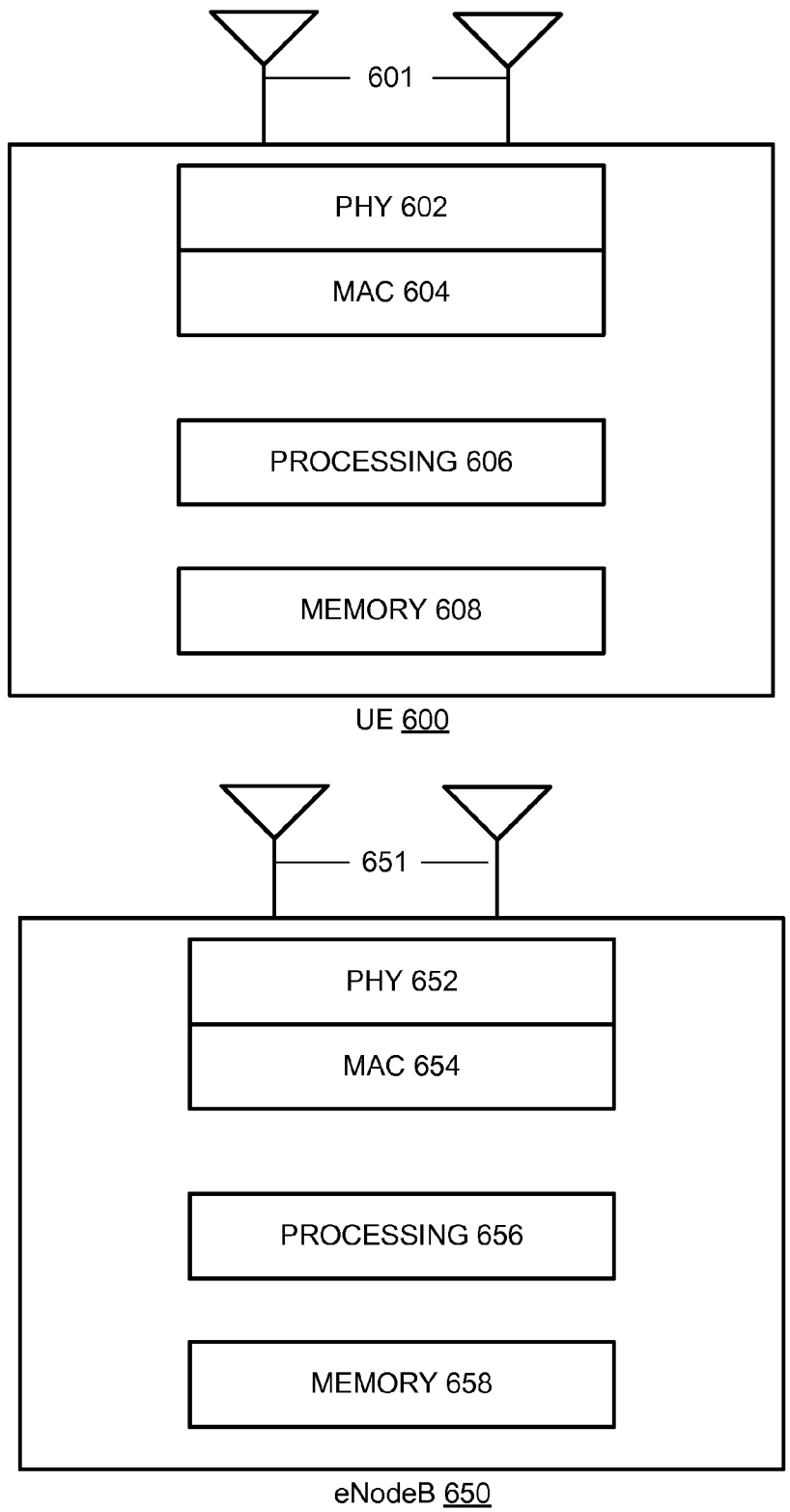
FIG. 6 illustrates a block diagram of a user equipment device and an eNodeB in accordance with some embodiments.

FIG. 6 illustrates a block diagram of a UE 600 and an eNodeB 650, in accordance with some embodiments. It should be noted that, in some embodiments, the eNodeB 650 can be a stationary (non-mobile) device. The UE 600 can include physical layer circuitry (PHY) 602 for transmitting and receiving signals to and from the eNodeB 650, other eNodeBs, other UEs, or other devices using one or more antennas 601, while the eNodeB 650 can include physical layer circuitry (PHY) 652 for transmitting and receiving signals to and from the UE 600, other eNodeBs, other UEs, or other devices using one or more antennas 651. The UE 600 can also include medium access control layer (MAC) circuitry 604 for controlling access to the wireless medium, while the eNodeB 650 can also include MAC circuitry 654 for controlling access to the wireless medium. The UE 600 can also include processing circuitry 606 and memory 608 arranged to perform the operations described herein, and the eNodeB 650 can also include processing circuitry 656 and memory 658 arranged to perform the operations described herein.

The antennas 601, 651 can comprise one or more directional or omnidirectional antennas, including, for example, dipole antennas, monopole antennas, patch antennas, loop antennas, microstrip antennas, or other types of antennas suitable for transmission of RF signals. In some multiple-input multiple-output (MIMO) embodiments, the antennas 601, 651 can be effectively separated to benefit from spatial diversity and the different channel characteristics that can result.

Although the UE 600 and eNodeB 650 are each illustrated as having several separate functional elements, one or more of the functional elements can be combined and can be implemented by combinations of software-configured elements, such as processing elements including digital signal processors (DSPs), and/or other hardware elements. For example, some elements can comprise one or more microprocessors, DSPs, field-programmable gate arrays (FPGAs), application specific integrated circuits (ASICs), radio-frequency integrated circuits (RFICs), and combinations of various hardware and circuitry for performing at least the functions described herein. In some embodiments, the functional elements can refer to one or more processes operating on one or more processing elements.

Embodiments can be implemented in one or a combination of hardware, firmware, and software. Embodiments can also be implemented as instructions stored on a computer-readable storage device, which can be read and executed by at least one processor to perform the operations described herein. A computer-readable storage device can include any non-transitory mechanism for storing information in a form readable by a machine (e.g., a computer). For example, a computer-readable storage device can include read-only memory (ROM), random-access memory (RAM), magnetic disk storage media, optical storage media, flash memory devices, and other storage devices and media. Some embodiments can include one or more processors and can be configured with instructions stored on a computer-readable storage device.

In accordance with embodiments, the UE 600 can operate in accordance with a D2D communication mode. The UE 600 can include processing circuitry 606 configured to determine a synchronization reference time based on reception of one or more signals from the eNodeB 650. The hardware processing circuitry 606 can be further configured to, during a D2D communication session, transmit multi-time transmission interval bundle groups (MTBGs) of data symbols during a first group of data transmission intervals (DTIs) and refrain from transmission of data symbols during a second group of DTIs that is exclusive of the first group of DTIs. Starting times of the DTIs can be based, at least partly, on the synchronization reference time. The hardware processing circuitry 606 can be further configured to transmit, during an in-network communication session exclusive of the D2D communication session, data symbols according to a time transmission interval (TTI) reference time that is synchronized to the synchronization reference time.

In some scenarios, the UE 600, operating in a cellular communication network, can begin to experience performance degradation for various reasons. As an example, user loading or throughput demands of the network 412 can become high. As another example, the UE 600 can move toward or beyond the edges of coverage cells. While operating in the network 412, the UE 600 can actually be in communication with other UEs that are physically located in close proximity to the UE 600, although the communication can take place through the network 412.

Figure 7:
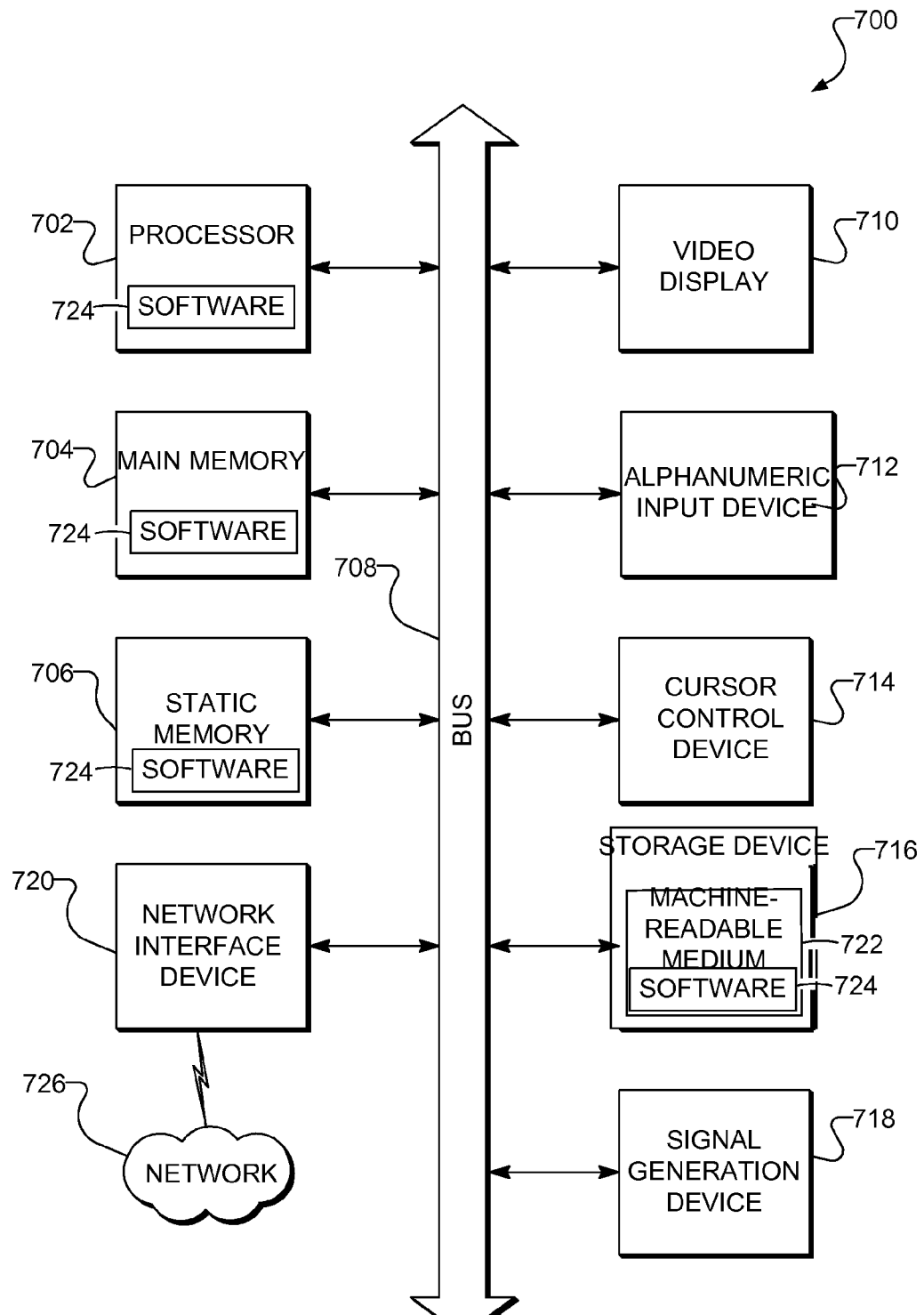
FIG. 7 illustrates a block diagram illustrating components of a machine, according to some example embodiments, able to read instructions from a machine-readable medium and perform any one or more of the methodologies discussed herein, according to aspects of the disclosure.

FIG. 7 illustrates a block diagram illustrating components of a machine, according to some example embodiments, able to read instructions from a machine-readable medium and perform any one or more of the methodologies discussed herein, according to aspects of the disclosure. In particular, FIG. 7 illustrates an exemplary computer system 700 (which can comprise any of the network elements discussed above) within which software 724 for causing the machine to perform any one or more of the methodologies discussed herein can be executed. In alternative embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The computer system 700 can function as any of the above described UEs or eNodeBs, and can be a personal computer (PC), a wearable mobile computing device, a tablet PC, a set-top box (STB), a PDA, a cellular telephone, a web appliance, a network router, switch, or bridge, or any machine capable of executing instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704, and a static memory 706, which communicate with each other via a bus 708. The computer system 700 can further include a video display unit 710 (e.g., an LCD or a cathode ray tube (CRT)). The computer system 700 also includes an alphanumeric input device 712 (e.g., a keyboard), a user interface navigation (or cursor control) device 714 (e.g., a mouse), a storage device 716, a signal generation device 718 (e.g., a speaker), and a network interface device 720.

The storage device 716 includes a non-transitory machine-readable medium 722 on which is stored one or more sets of data structures and software 724 embodying or utilized by any one or more of the methodologies or functions described herein. The software 724 can also reside, completely or at least partially, within the main memory 704 and/or within the processor 702 during execution thereof by the computer system 700, with the main memory 704 and the processor 702 also constituting non-transitory machine-readable media 722. The software 724 can also reside, completely or at least partially, within the static memory 706.

While the non-transitory machine-readable medium 722 is shown, in an example embodiment, to be a single medium, the term "machine-readable medium" can include a single medium or multiple media (e.g., a centralized or distributed database, and/or associated caches and servers) that store the one or more data structures and software 724. The term "machine-readable medium" can also be taken to include any tangible medium that is capable of storing, encoding, or carrying instructions for execution by the machine and that cause the machine to perform any one or more of the methodologies of the present embodiments, or that is capable of storing, encoding, or carrying data structures utilized by or associated with such instructions. The term "machine-readable medium" can accordingly be taken to include, but not be limited to, solid-state memories, and optical and magnetic media. Specific examples of machine-readable media 722 include non-volatile memory, including by way of example semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disc read-only memory (CD-ROM) and digital versatile disc (or digital video disc) read-only memory (DVD-ROM) disks.

The software 724 can further be transmitted or received over a communications network 726 using a transmission medium. The software 724 can be transmitted using the network interface device 720 and any one of a number of well-known transfer protocols (e.g., HyperText Transfer Protocol (HTTP)). Examples of communication networks 726 include a local area network (LAN), a wide area network (WAN), the Internet 112, mobile telephone networks, plain old telephone service (POTS) networks, and wireless data networks (e.g., WiFi and WiMax networks). The term "transmission medium" can be taken to include any intangible medium capable of storing, encoding, or carrying instructions for execution by the machine, and includes digital or analog communications signals or other intangible media to facilitate communication of such software 724.

The drawings and the forgoing description give examples of the present disclosure. Although embodiments are depicted as a number of disparate functional items, those skilled in the art will appreciate that one or more of such elements can well be combined into single functional elements. Alternatively, certain elements can be split into multiple functional elements. Elements from one embodiment can be added to another embodiment. For example, orders of processes described herein can be changed and are not limited to the manner described herein. Moreover, the operations of any flow diagram need not be implemented in the order shown; nor do all of the operations necessarily need to be performed. Also, those operations that are not dependent on other operations can be performed in parallel with the other operations. The scope of the present disclosure, however, is by no means limited by these specific examples. Numerous variations, whether explicitly given in the specification or not, such as differences in structure, dimension, and use of material, are possible. The scope of the disclosure is at least as broad as given by the following claims.

It is submitted with the understanding that it will not be used to limit or interpret the scope or meaning of the claims. The following claims are hereby incorporated into the detailed description, with each claim standing on its own as a separate embodiment.

In some embodiments a user equipment (UE) comprising a mobile termination (MT) to transmit and receive messages from a cellular network, and a terminal equipment (TE) to execute one or more applications to utilize one or more packet data network (PDN) connections of the cellular network or a non-cellular network, and a terminal adaptor (TA) to forward an attention (AT) command received from the TE to the MT, the MT to receive the forwarded AT command as an MT control command, the AT command comprising a request for at least one of data for a specific PDN connection that can be offloaded from the cellular network to the non-cellular network, offload assistance data, or offload cellular measurement data, forward an MT status message generated by the MT as an AT command response to the TE, the AT command response to include the requested data, and forward an unsolicited result code generated by the MT to the TE when at least one of offloadablity of the specific PDN connection changes, offload assistance data changes, or offload cellular measurements meet the criteria of offload assistance data.

In some embodiments, the AT command comprises a packet domain event reporting (+CGEREP) AT command, and the MT is to further send one or more unsolicited result codes (+CGEV) to the TE indicating whether the specific PDN connection can be offloaded from the cellular network to the non-cellular network when a packet data protocol (PDP) context associated with the specific PDN connection is at least one of activated, deactivated, or modified. In some embodiments, the one or more unsolicited result codes (+CGEV) comprises data indicating the specific PDN connection cannot be offloaded from the cellular network to the non-cellular network.

In some embodiments, the AT command comprises a packet data protocol (PDP) context read dynamic parameters (+CGCONTRDP) AT command, and the AT command response comprises data identifying one or more parameters of a primary PDP context. In some embodiments, the AT command response further comprises an integer value that indicates whether the specific PDN connection associated with the primary PDP context can be offloaded from the cellular network to the non-cellular network, the integer value to comprise at least one of: 0 to indicate offloading when the specific PDN connection is in an S1 mode or when in an Iu mode is not acceptable, 1 to indicate offloading when the specific PDN connection is in the S1 mode is acceptable, but not acceptable in the Iu mode, 2 to indicate offloading when the specific PDN connection is in the Iu mode is acceptable, but not acceptable in the S1 mode, or 3 to indicate offloading when the specific PDN connection is in the S1 mode or when in the Iu mode is acceptable.

In some embodiments, the AT command comprises a secondary packet data protocol (PDP) context read dynamic parameters (+CGSCONTRDP) AT command, and the AT command response comprises data identifying one or more parameters of a secondary PDP context. In some embodiments, the AT command response further comprises an integer value that indicates whether the specific PDN connection associated with the secondary PDP context can be offloaded from the cellular network to the non-cellular network, the integer value to comprise at least one of 0 to indicate offloading when the specific PDN connection is in an S1 mode or when in an Iu mode is not acceptable, 1 to indicate offloading when the specific PDN connection is in the S1 mode is acceptable, but not acceptable in the Iu mode, 2 to indicate offloading when the specific PDN connection is in the Iu mode is acceptable, but not acceptable in the S1 mode, or 3 to indicate offloading when the specific PDN connection is in the S1 mode or when in the Iu mode is acceptable.

In some embodiments, the AT command comprises a wireless local area network (WLAN) offload assistance data (+CWLANOLAD) AT command, and the AT command response comprises WLAN offload assistance data identifying at least one threshold values for a received signal code power, threshold values for a received energy per pseudo-random noise (PN) chip to a total received power spectral density ratio, threshold values for a reference signal received power, threshold values for a reference signal received quality, threshold values for WLAN channel utilization, an Offload Preference Indicator (opi), a Steering Interval (tSteering), threshold values for backhaul available downlink and/or uplink bandwidth, threshold values of beacon received signal strength indicators (RSSIs), or a WLAN identifier list. In some embodiments, the MT is to further send one or more unsolicited result codes (+CWLANOLADI) to the TE to indicate a change in one or more of the WLAN offload assistance data.

In some embodiments, the AT command comprises a wireless local area network (WLAN) offload cell measurement (+CWLANOLCM) AT command, and the AT command response comprises measurement information of a primary serving cell associated with the MT. In some embodiments, the MT is to further send one or more unsolicited result codes (+CWLANOLCMI) to the TE including one or more cellular signal measurements that have met WLAN offload assistance data thresholds, the cellular signal measurements to comprise at least one of a received signal code power, a ratio of a received energy per pseudorandom noise (PN) chip to a total received power spectral density, a reference signal received power, or a reference signal received quality.

In some embodiments, the UE further comprises one or more antennas to transmit and receive signal data from at least one of the cellular network and the non-cellular network, wherein the MT comprises one or more baseband processors to process the signal data received via the one or more antennas.

In some embodiments, the cellular network comprises at least one of a Universal Mobile Telecommunications Service Terrestrial Radio Access Network/GSM (Global System for Mobile Communications) Edge Radio Access Network (UTRAN/GERAN)-based serving network, or an Evolved Universal Mobile Telecommunications Service Terrestrial Radio Access Network (E-UTRAN)-based serving network.

In some embodiments, the AT command further comprises a set command to enable and disable sending of unsolicited result codes.

In some embodiments, the TA is to further forward a test version of the AT command received from the TE to the MT to query for possible values of one or more parameters of the AT command.

Some embodiments describe a non-transitory computer-readable storage medium comprising contents that, when executed by a user equipment (UE), cause the UE to perform operations to execute one or more applications utilizing one or more packet data network (PDN) connections of a cellular network or a non-cellular network, generate an attention (AT) command for a mobile terminal (MT), the AT command comprising a request for at least one of data for a specific PDN connection that can be offloaded from the cellular network to the non-cellular network, offload assistance data, or offload cellular measurement data, and receive an AT command response, corresponding to the AT command, comprising the requested data specific to the PDN connection that can be offloaded from the cellular network to the non-cellular network, the offload assistance data, and/or the offload cellular measurement data, and receive an unsolicited result code when at least one of offloadablity of the specific PDN connection changes, offload assistance data changes, or offload cellular measurements meet the criteria of offload assistance data.

In some embodiments, the AT command comprises a packet domain event reporting (+CGEREP) AT command, and the MT is to further send one or more unsolicited result codes (+CGEV) to the TE indicating whether the PDN connection can be offloaded from the cellular network to the non-cellular network when the PDN connection is at least one of activated, deactivated, or modified.

In some embodiments, the AT command comprises a packet data protocol (PDP) context read dynamic parameters (+CGCONTRDP) AT command, the AT command response further comprises data identifying one or more parameters of a primary packet data protocol (PDP) context of the specific PDN connection, and the AT command response further comprises an integer value that indicates whether the specific PDN connection associated with the primary PDP context can be offloaded from the cellular network to the non-cellular network, the integer value to comprise at least one of 0 to indicate offloading when the specific PDN connection is in an S1 mode or when in an Iu mode is not acceptable, 1 to indicate offloading when the specific PDN connection is in the S1 mode is acceptable, but not acceptable in the Iu mode, 2 to indicate offloading when the specific PDN connection is in the Iu mode is acceptable, but not acceptable in the S1 mode, or 3 to indicate offloading when the specific PDN connection is in the S1 mode or when in the Iu mode is acceptable.

In some embodiments, the AT command comprises a secondary packet data protocol (PDP) context read dynamic parameters (+CGSCONTRDP) AT command, the AT command response comprises data identifying one or more parameters of a secondary PDP context of the specific PDN connection, and the AT command response further comprises an integer value that indicates whether the specific PDN connection associated with the secondary PDP context can be offloaded from the cellular network to the non-cellular network, the integer value to comprise at least one of 0 to indicate offloading when the specific PDN connection is in an S1 mode or when in an Iu mode is not acceptable, 1 to indicate offloading when the specific PDN connection is in the S1 mode is acceptable, but not acceptable in the Iu mode, 2 to indicate offloading when the specific PDN connection is in the Iu mode is acceptable, but not acceptable in the S1 mode, or 3 to indicate offloading when the specific PDN connection is in the S1 mode or when in the Iu mode is acceptable.

In some embodiments, the non-cellular network comprises a wireless local area network (WLAN), the AT command comprises a WLAN offload assistance data (+CWLANOLAD) AT command, and the AT command response comprises WLAN offload assistance data identifying at least one threshold values for a received signal code power, threshold values for a received energy per pseudo-random noise (PN) chip to a total received power spectral density ratio, threshold values for a reference signal received power, threshold values for a reference signal received quality, threshold values for WLAN channel utilization, an Offload Preference Indicator (opi), a Steering Interval (tSteering), threshold values for backhaul available downlink and/or uplink bandwidth, threshold values of beacon received signal strength indicators (RSSIs), or a WLAN identifier list, and the MT is to further send one or more unsolicited result codes (+CWLANOLADI) to the TE to indicate a change in one or more of the WLAN offload assistance data.

In some embodiments, the non-cellular network comprises a wireless local area network (WLAN), the AT command comprises a WLAN offload cell measurement (+CWLANOLCM) AT command, and the AT command response comprises measurement information of a primary serving cell associated with the MT, and the MT is to further send one or more unsolicited result codes (+CWLANOLCMI) to the TE indicating at least one or more WLAN offload cell measurements have met WLAN offload assistance data thresholds, the one or more WLAN offload cell measurements to include at least one of a received signal code power, a ratio of a received energy per pseudorandom noise (PN) chip to a total received power spectral density, a reference signal received power, or a reference signal received quality.

Some embodiments describe a baseband chipset comprising circuitry to receive an Attention (AT) command from a Terminal Adapter (TA) communicatively coupled to a Terminal Equipment (TE), the AT command to comprise a request for at least one of offload characteristics of a packet data network (PDN) connection, offload assistance data, or offload cellular measurements, circuitry to generate a mobile termination (MT) status message and transmit the MT status message to TA, the MT status message including the requested data for the PDN connection, the offload assistance data, and/or the offload cellular measurements, and circuitry to generate MT unsolicited result codes and transmit the unsolicited result codes to TA when at least one of offloadablity of a PDN connection changes, the offload assistance data changes, or the offload cellular measurements change with respect to a criteria of offload assistance data.

In some embodiments, the MT status message further comprises one or more unsolicited result codes (+CGEV) indicating whether the PDN connection can be offloaded from a cellular network to a non-cellular network when a packet data protocol (PDP) context is at least one of activated, deactivated, or modified.

In some embodiments, the MT status message further comprises at least one of data identifying one or more parameters of a primary packet data protocol (PDP) context information, or data identifying one or more parameters of a secondary packet data protocol (PDP) context information.

In some embodiments, the non-cellular network comprises a wireless local area network (WLAN), and the MT status message comprises data identifying at least one of cellular signal strength, cellular signal power, bandwidth, or service characteristics of the WLAN, or measurement information of a primary serving cell associated with the MT.

The invention claimed is:

1. An apparatus of a user equipment (UE) comprising:
a mobile termination (MT) to transmit messages to and receive messages from a cellular network,
a terminal equipment (TE) to execute an application to use a packet data network (PDN) connection of the cellular network or a wireless local access network (WLAN); and
a terminal adaptor (TA) to:
forward an attention (AT) command received from the TE to the MT, the AT command related to disposition of traffic dependent on a status of a context of the PDN connection; and
forward an AT command response to the TE in response to the AT command.

2. The apparatus of claim 1, wherein:
the AT command is related to WLAN offloading of traffic from the cellular network to the WLAN when the context is activated, deactivated or modified.

3. The apparatus of claim 2, wherein:
the AT command is a packet domain event reporting (+CGEREP) AT command.

4. The apparatus of claim 3, wherein:
the MT is to send an unsolicited result code (+CGEV) to the TE indicating whether the PDN connection can be offloaded from the cellular network to the WLAN when the context is activated, deactivated or modified.

5. The apparatus of claim 1, wherein:
the AT command response is forwarded to the TE when the AT command is a set command having a setting, and the response is an error caused by the setting being unsupported by the MT.

6. The apparatus of claim 1, wherein:
the AT command response is forwarded to the TE when the AT command is a read command or a test command, the response returns a current mode and buffer settings when the AT command is the read command, and the response returns modes and buffer settings supported by the MT when the AT command is the test command.

7. The apparatus of claim 1, wherein:
the AT command response indicates that the cellular network activated the context, and
the context is limited to represent a primary packet data protocol (PDP) context.

8. The apparatus of claim 1, wherein:
the AT command response indicates that the MT activated the context, and
the context represents a primary packet data protocol (PDP) context or the PDN connection.

9. The apparatus of claim 8, wherein:
the AT command reponse is sent in response to an explicit context activation request (+CGACT) or an implicit context activation request associated with an attach request (+CGAIT=1).

10. The apparatus of claim 9, wherein:
a reason parameter of the AT command is an integer that indicates a reason why context activation was not granted.

11. The apparatus of claim 10, wherein at least one of:
the reason parameter is included if a requested PDP type is IPv4v6, and a PDP type assigned by the cellular network is either IPv4 or IPv6, or
a secondary context parameter of the AT command is an integer that indicates a context identifier allocated by the MT for an MT initiated context of a second address type and is included only if:
the reason parameter indicates that only single address bearers are allowed,
the MT supports MT-initiated context activation of the second address type without additional commands from the TE, and
the MT has activated a packet data protocol (PDP) context or specific PDN connection associated with the secondary context parameter.

12. The apparatus of claim 1, wherein:
when the AT command response indicates that the cellular network deactivated the context, the context is limited to represent a primary packet data protocol (PDP) context.

13. The apparatus of claim 1, wherein:
a parameter of the AT command response that indicates WLAN offload is an integer that specifies one of:
different connectivity conditions under which the WLAN offload is acceptable, or
whether the AT command is an informational element and whether the TE is to acknowledge the AT command.

14. The apparatus of claim 1, wherein:
a parameter of the AT command response that indicates the context has an integer value that is local to a TE-MT interface and is provided to the TE.

15. The apparatus of claim 1, wherein:
the AT command comprises a packet domain event reporting (+CGEREP) AT command, the MT is to send an unsolicited result code (+CGEV) to the TE indicating that the context has been modified, and
a change parameter of the AT command indicating the context has an integer value that is a bitmap that indicates what kind of change occurred.

16. The apparatus of claim 15, wherein at least one of:
the change parameter is a sum of all applicable changes, or
the change parameter has a first bit to indicate change of a traffic flow template (TFT) changed, a second bit to indicate change of a Quality of Service (QoS), and a third bit to indicate change of a WLAN offload.

17. An apparatus of a user equipment (UE) comprising:
a mobile termination (MT) to transmit messages to and receive messages from a cellular network,
a terminal equipment (TE) to execute an application to use a packet data network (PDN) connection of the cellular network or a wireless local access network (WLAN); and
a terminal adaptor (TA) to:
forward an attention (AT) command received from the TE to the MT, the AT command related to disposition of traffic dependent on a status of a context of the PDN connection, a change parameter of the AT command indicating the context has an integer value that indicates what kind of change occurred via either a sum of all applicable changes or individual bits to indicate different changes; and
forward an AT command response to the TE in response to the AT command.

18. The apparatus of claim 17, wherein:
the AT command is related to WLAN offloading of traffic from the cellular network to the WLAN when the context is activated, deactivated or modified.

19. A non-transitory computer-readable storage medium comprising instructions that, when executed by a user equipment (UE), cause the UE to perform operations to:
forward an attention (AT) command received from terminal equipment (TE) to a mobile termination (MT), the AT command related to disposition of traffic dependent on a status of a context of a packet data network (PDN) connection; and
forward, in response to the AT command, an AT command response to the TE, the AT command response dependent on the AT command.

20. The non-transitory computer-readable storage medium of claim 18, wherein:
the AT command is related to wireless local access network (WLAN) offloading of traffic from a cellular network to a WLAN when the context is activated, deactivated or modified.

* * * * *